Oct. 24, 1939.  F. AUTEM  2,177,615

MEANS FOR MARKING ARTICLES

Filed July 28, 1937   12 Sheets-Sheet 1

INVENTOR:
Fred Autem,
BY
ATTORNEY.

Oct. 24, 1939.　　　　　F. AUTEM　　　　　2,177,615
MEANS FOR MARKING ARTICLES
Filed July 28, 1937　　　12 Sheets-Sheet 2
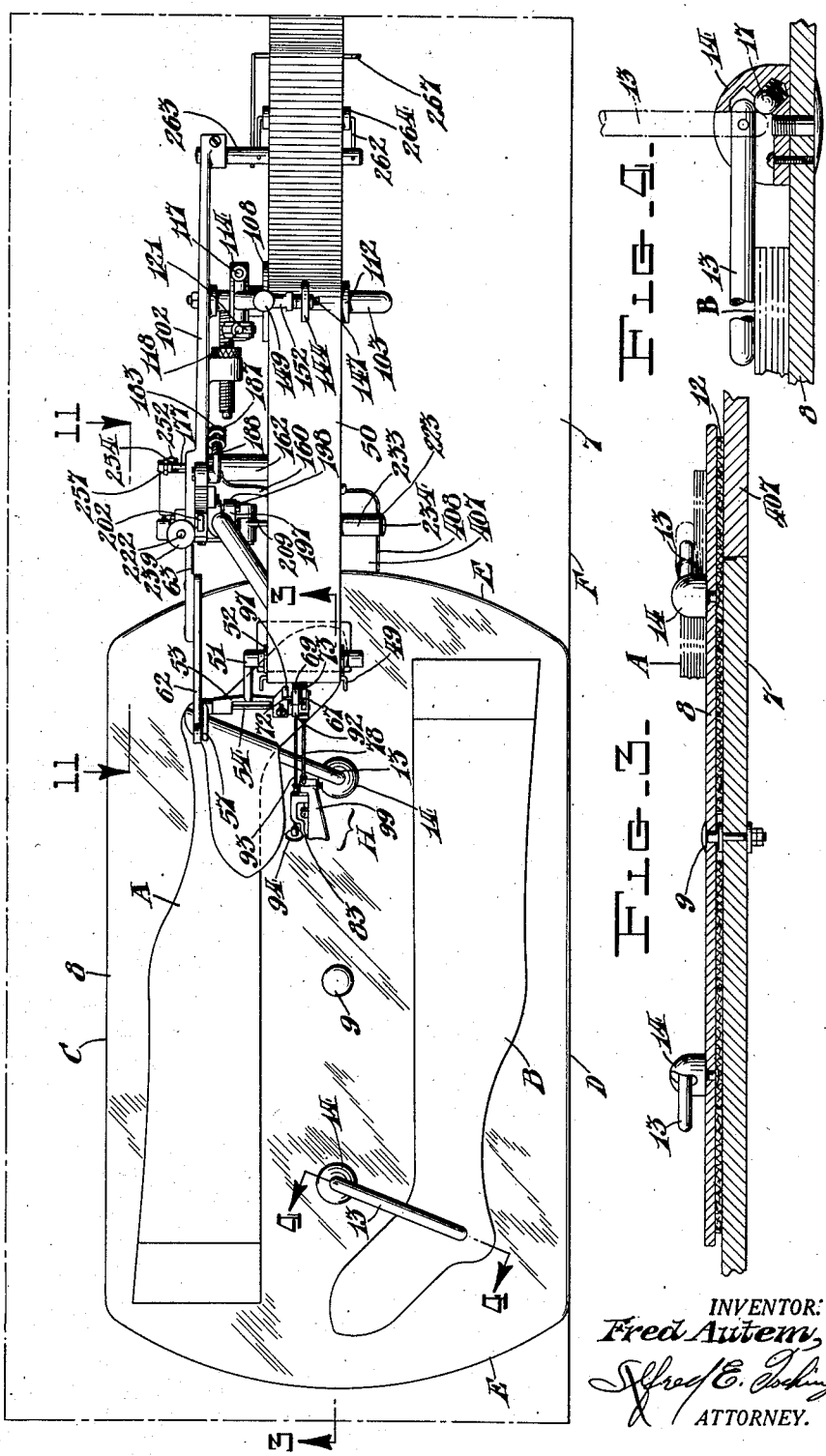
INVENTOR:
Fred Autem,
ATTORNEY.

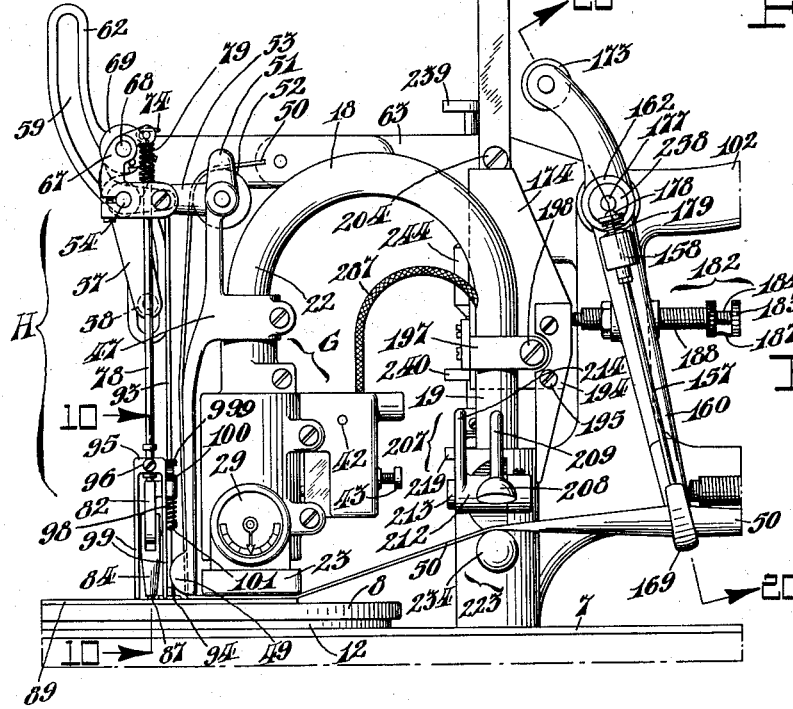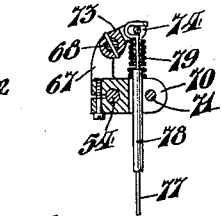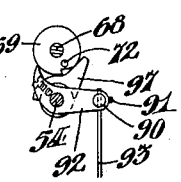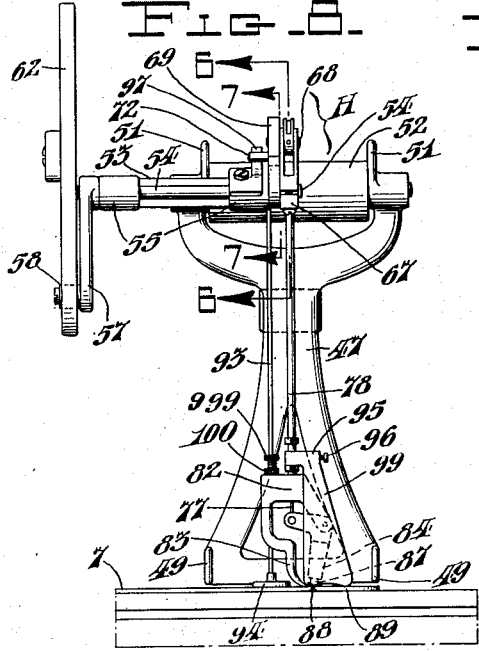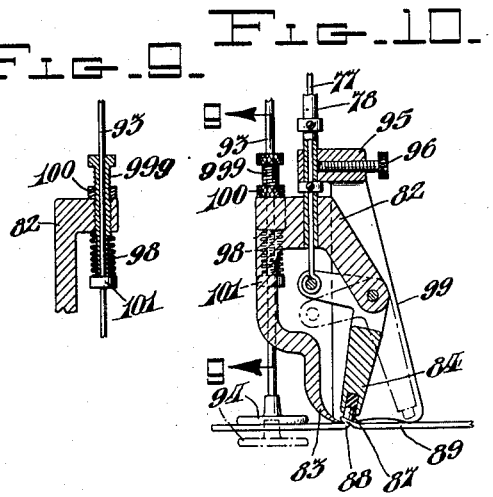

Oct. 24, 1939.   F. AUTEM   2,177,615
MEANS FOR MARKING ARTICLES
Filed July 28, 1937   12 Sheets-Sheet 4
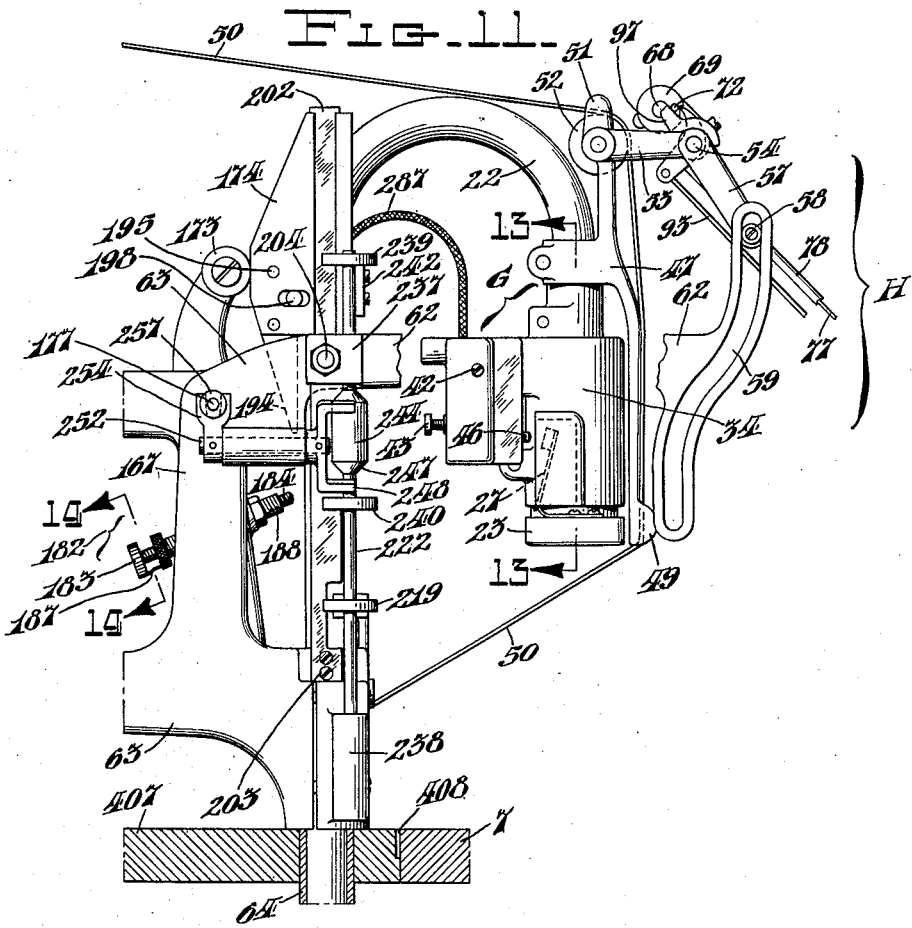
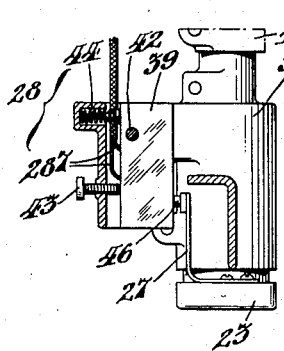
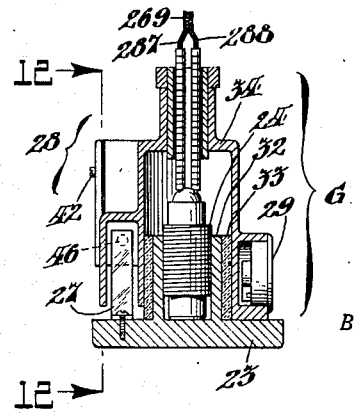
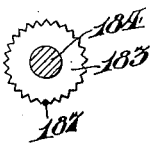
INVENTOR:
Fred Autem
BY
ATTORNEY.

INVENTOR:
Fred Autem
BY
ATTORNEY.

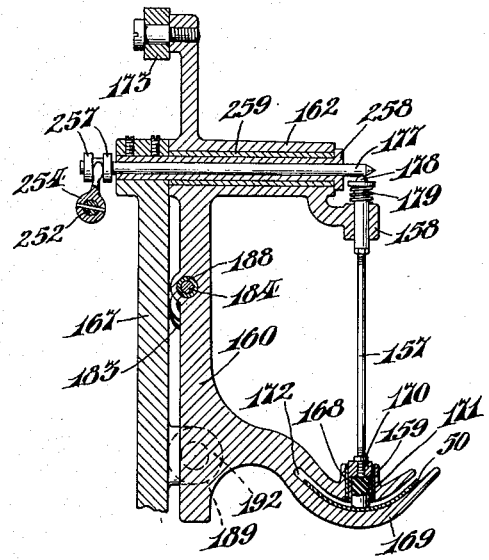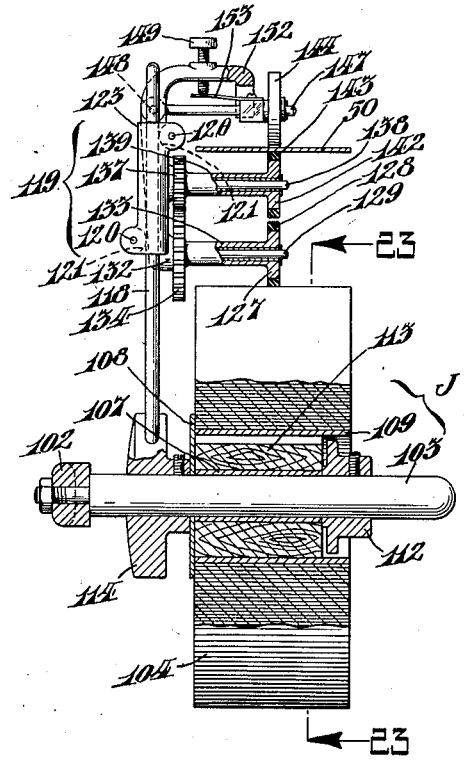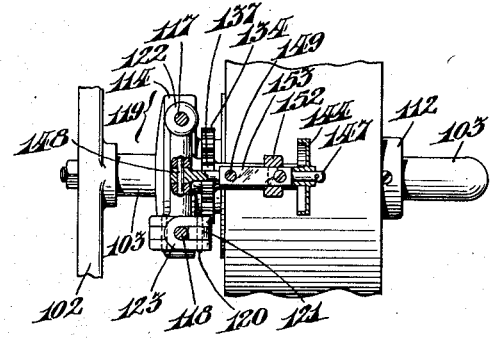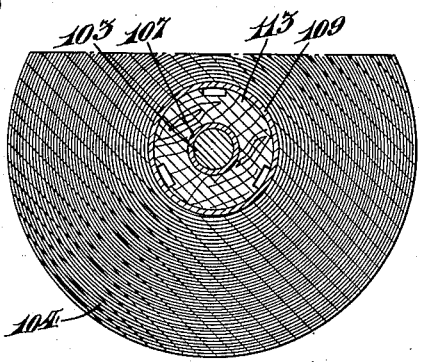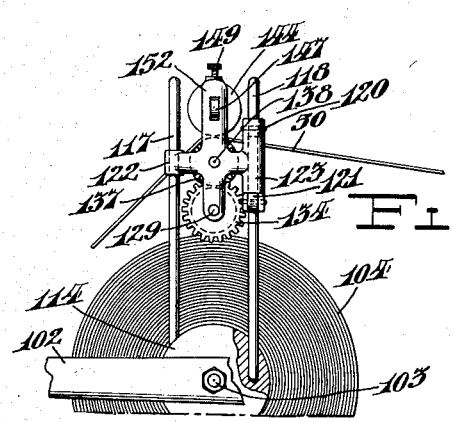

Oct. 24, 1939.　　　　F. AUTEM　　　　2,177,615
MEANS FOR MARKING ARTICLES
Filed July 28, 1937　　　12 Sheets-Sheet 7
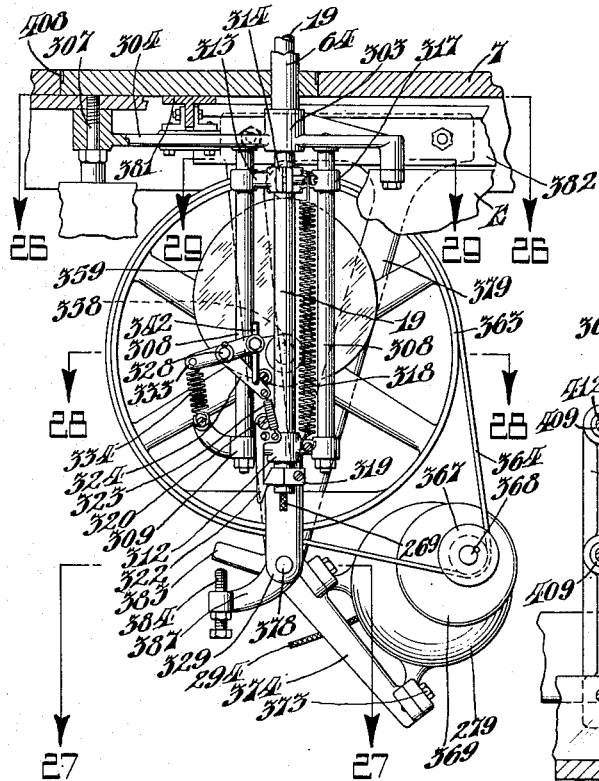
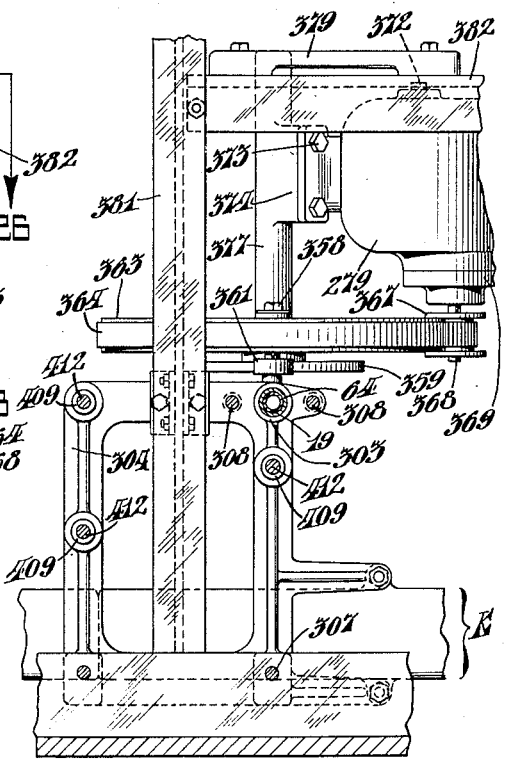
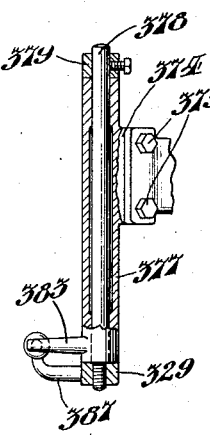
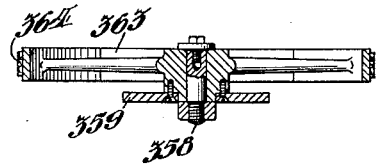
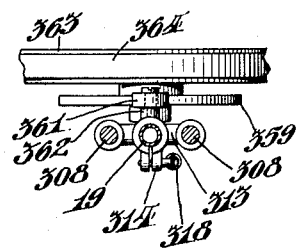
INVENTOR:
Fred Autem,
BY
ATTORNEY.

Oct. 24, 1939.　　　　　F. AUTEM　　　　2,177,615
MEANS FOR MARKING ARTICLES
Filed July 28, 1937　　12 Sheets-Sheet 8
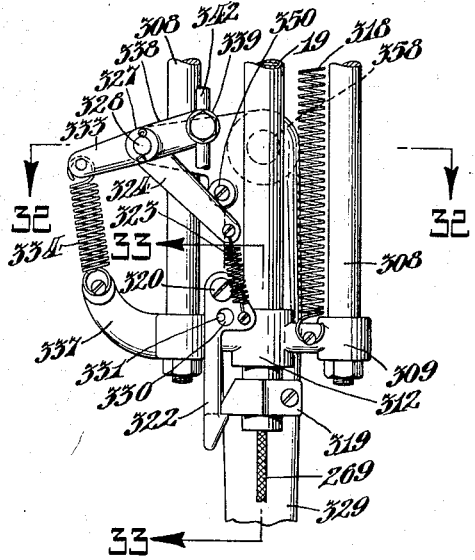
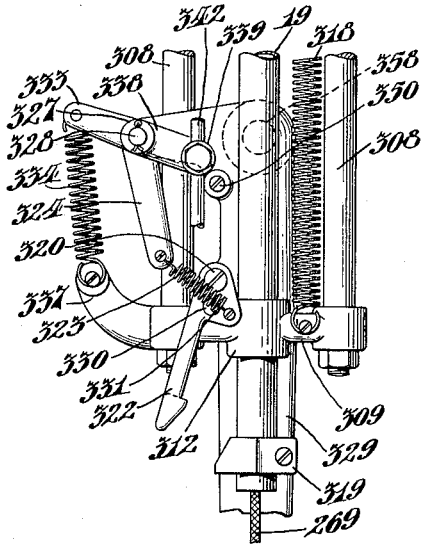
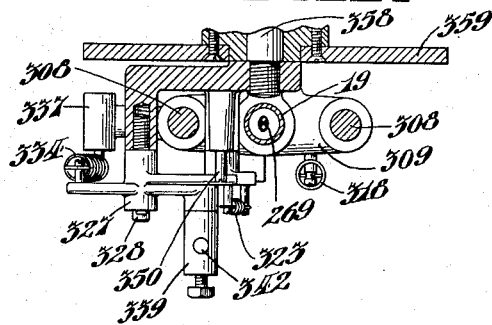
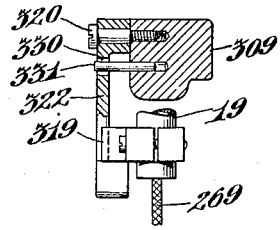
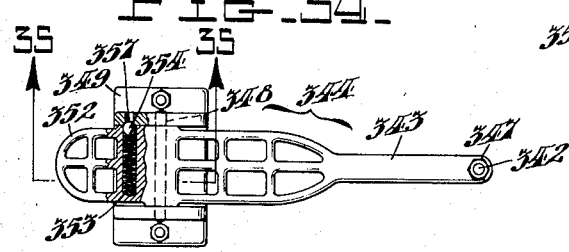
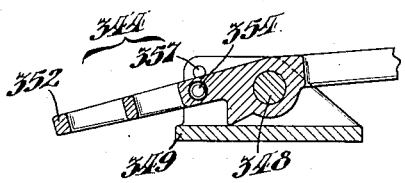
INVENTOR:
Fred Autem,
BY Alfred E. Ischinger
ATTORNEY.

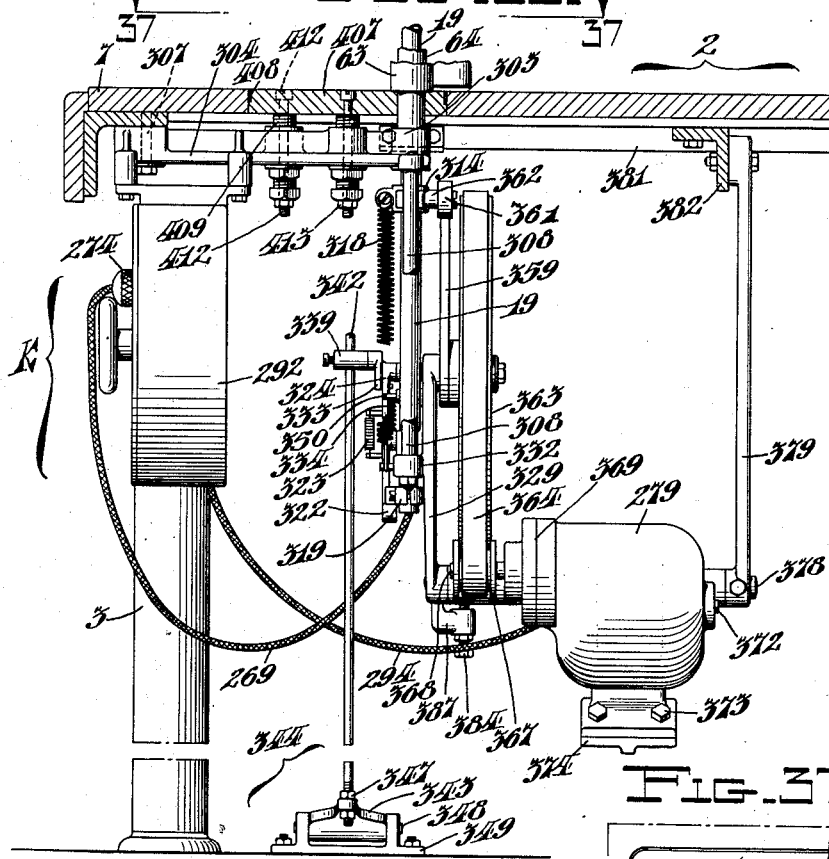
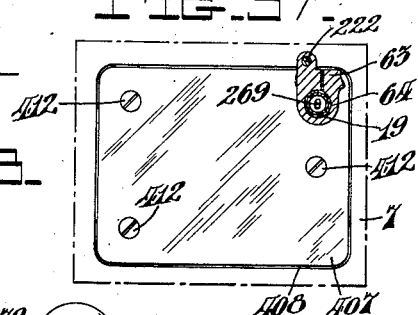
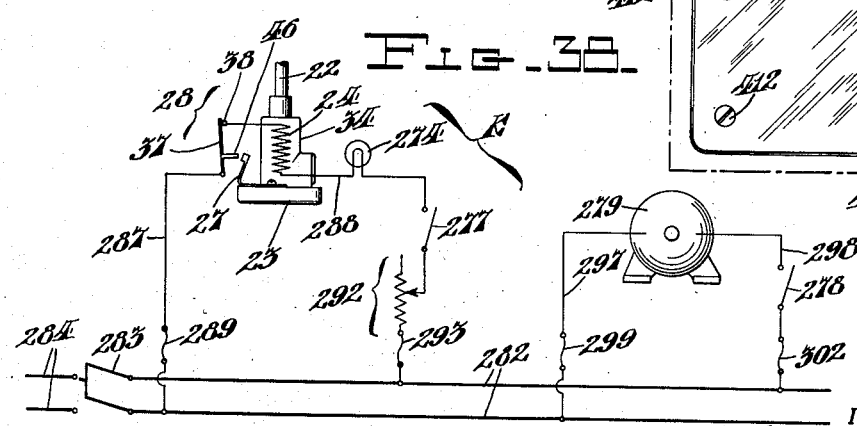

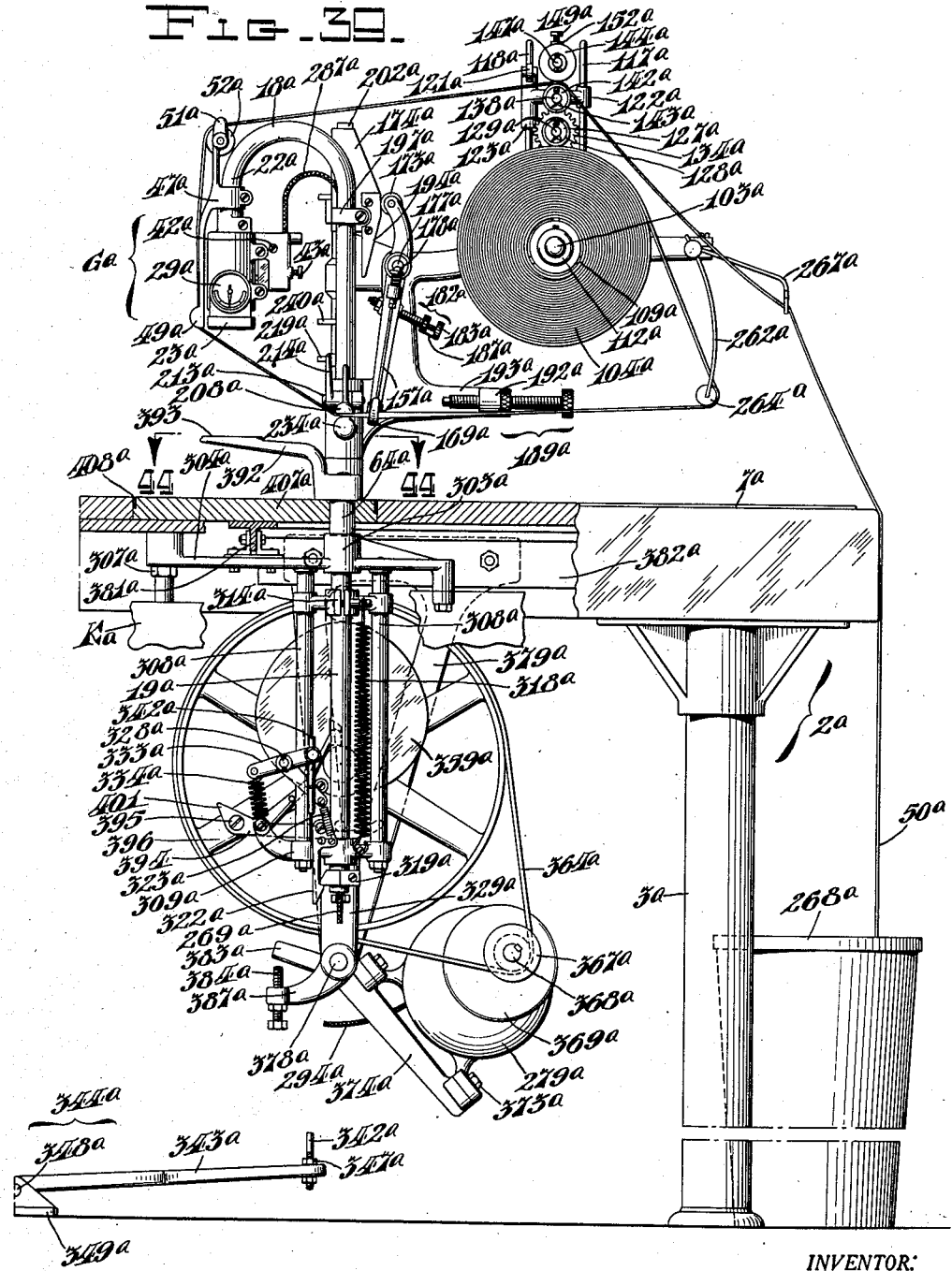

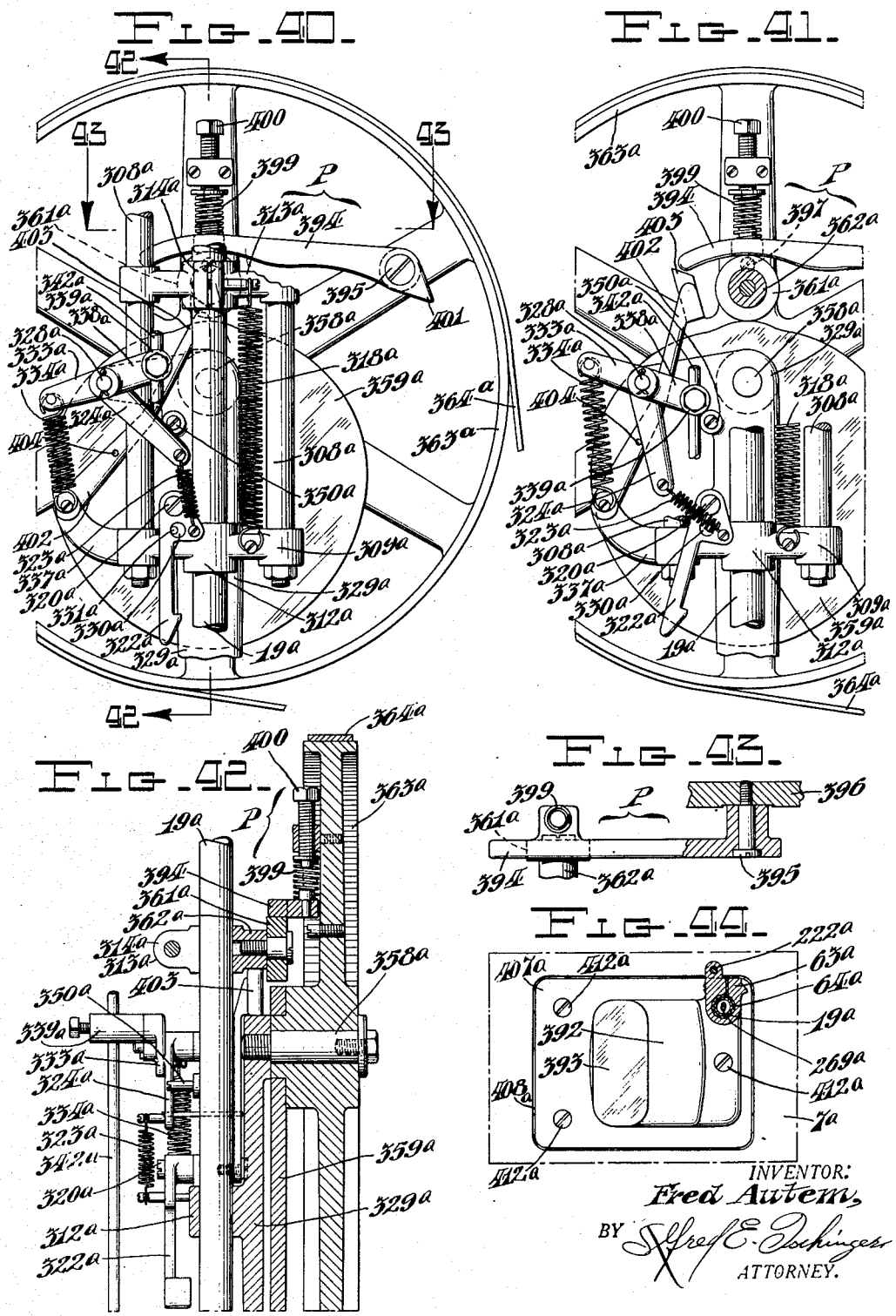

Patented Oct. 24, 1939

2,177,615

UNITED STATES PATENT OFFICE 2,177,615

MEANS FOR MARKING ARTICLES

Fred Autem, Wyomissing, Pa., assignor to Textile Machine Works, Wyomissing, Pa., a corporation of Pennsylvania Application July 28, 1937, Serial No. 156,166

28 Claims. (Cl. 41—1)

My invention relates to stamping devices, and more particularly to those adapted for conveying imprints by heat and pressure from transfer elements, such as paper ribbons having the imprints thereon, to fabrics, such as felt hats, knitted hosiery, bathing suits, underwear and the like.

In the art of marking articles or fabrics of the above indicated kind by heating and pressing against the articles, papers or like elements bearing insignia such as trade marks, size-indicating characters and the like, many factors have heretofore rendered difficult the practice of an effective method or the production of a device or machine that is simple, durable, economical, free from disorder, consistent in its operation and results, sufficiently rapid, and that has other qualities rendering it desirable.

Among the obstacles in the way of such prior methods and mechanisms are the widely variegated shapes, sizes and textures of the articles to be stamped, the inability to control the stamp heat, the high cost of producing the machines, the lack of ability to handle the articles quickly and expeditiously, the inability to properly feed, tension and take off the transfer ribbon, the different stamp pressure required for marking different articles, the inability to control and prevent damage to the machines, the likelihood of burning the paper or the operator's hands, trouble in loading and unloading the machines with transfer paper, and various other adverse factors difficult to overcome and to correlate into a smooth working device.

It is among the objects of this invention to overcome the above mentioned and other difficulties in connection with devices of this type and to provide a mechanism that is free from the adverse factors set forth and an improvement generally in the art of marking fabrics by the mentioned transfer elements.

Another object of the invention is to provide a novel thermostatic switch control and adjustment, together with a thermal indicator, whereby the particular temperature of a stamp for passing transfer elements against articles of any given class may be maintained constant within close limits, and the elements for obtaining this result may be grouped in a compact, effective, self contained unit.

Among other objects of the invention are to provide novel transfer paper advancing means, prevent backward movement of the paper, utilize a paper tension overdrive mechanism tending to take up the paper faster than it is fed whereby to ensure highly effective tensioning, and to operate the latter feature from the feed roll by a novel float support and other features as will appear.

Another object of the invention is to provide a novel actuating means for a reciprocable stamp that is biased toward stamping position, whereby a cam having a high spot operates to withdraw the stamp from stamping position to inactive position, and a latch is provided to catch the stamp at the inactive position opposite the high spot of the cam and to release the stamp opposite the cam high spot to avoid dropping portions of the mechanism onto the lower cam parts.

Another object of the invention is to provide means for effectively holding the paper off the stamp to prevent burning the paper in inactive and intermediate positions of the stamp.

Another object of the invention is to provide a novel fabric pick up arm and grip structure whereby as portions of stacked articles, such as stockings, are successively stamped, the pick up device is operated to pick up the stamped portions and fold them to position out of the path of movement of the stamp, while retaining the stacked bodies in position adjacent to the stamp.

Another object of the invention is to provide a novel device for loading a stamping machine with articles, such as stockings, as by a turntable having stocking receiving portions spaced such that, when a stack of stockings on one of the receiving portions is in stamping and folding position, another receiving portion is in position for unloading and loading stockings relative thereto, and this relation may be obtained quickly by positioning the turntable in predetermined relation to a main table on which it is mounted.

Another object of the invention is, in a reciprocable stamp that is biased as by spring means toward its stamping position, to augment the pressure of the stamp by a spring cam mechanism operating during the final increments of the stamp pressing stroke.

Another object of the invention is to prevent damage to a machine of the above indicated character in the event of sticking of certain parts, to provide a novel operating treadle, to avoid stamping a pad on which the articles are placed for stamping and to provide other features of novelty and improvement.

A further object of the invention is to provide a device of the above indicated character that is simple and durable in construction, economical to manufacture and effective in its operation.

With these and other objects in view, which will become apparent from the following detailed description of the illustrative embodiments of the invention shown in the accompanying drawings, my invention resides in the novel elements, features of construction and arrangement of parts in cooperative relationship as hereinafter more particularly pointed out in the claims.

In the drawings: Figure 1 is a view in front elevation, parts being broken away, of a main table on which an example of the device of my invention is shown in its inactive or non-stamping position;

Fig. 2 is a top plan view of the device, and a portion of the table, of Fig. 1, showing particularly a novel turntable structure for moving stockings between a stamping position and a position at which the stockings are loaded and unloaded relative to the turntable;

Fig. 3 is a sectional view taken substantially along the line 3—3 of Fig. 2, parts being broken away, of the turntable and the top of a main supporting table of Fig. 2;

Fig. 4 is a sectional view taken substantially along the line 4—4 of Fig. 2, parts being broken away, emphasizing particularly a novel element or arm for holding the stockings in position and over which the stockings are folded;

Fig. 5 is a detail side elevational view of a portion of a novel stamp operating and heating structure and other elements shown at the upper central portion of Fig. 1, enlarged relative thereto and illustrating the parts as positioned at the moment of stamping;

Fig. 6 is a detail sectional view taken substantially along the line 6—6 of Fig. 8, of portions of a mechanism for picking up and folding stocking portions according to the invention;

Fig. 7 is a detail sectional view taken substantially along the line 7—7 of Fig. 8, also of portions of the mechanism for picking up and folding stocking portions;

Fig. 8 is a view in elevation at right angles to Fig. 5, of the apparatus thereof viewed from the left;

Fig. 9 is a sectional view taken substantially along the line 9—9 of Fig. 10;

Fig. 10 is a sectional view taken substantially along the line 10—10 of Fig. 5, showing more in detail certain novel fingers of the pick-up mechanism;

Fig. 11 is a view partially in section and partially in elevation taken substantially along the line 11—11 of Fig. 2 enlarged relative thereto;

Fig. 12 is a sectional view, taken substantially along the line 12—12 of Fig. 13, of a novel self contained stamp, stamp heater and switch unit of the invention;

Fig. 13 is a sectional view taken substantially along the line 13—13 of Fig. 11, showing a heater, a thermo responsive bimetallic switch control element and a thermo responsive indicator or thermometer;

Fig. 14 is a detail sectional view, taken substantially along the line 14—14 of Fig. 11, of a micrometer adjustment element for a ribbon feed device of the invention;

Fig. 20 is a sectional view taken substantially along the line 20—20 of Fig. 5 showing the elements as positioned therein;

Fig. 21 is a sectional view taken substantially along the line 21—21 of Fig. 1, enlarged relative thereto, of a novel ribbon reel and tensioning mechanism of the invention;

Fig. 22 is a fragmentary detail view, partially in top plan and partially in section of the tensioning structure shown in Fig. 21;

Fig. 23 is a sectional view taken substantially along the line 23—23 of Fig. 21, parts being broken away of the reel and reel support of Fig. 21;

Fig. 24 is a view of the structure of Fig. 21, taken at right angles thereto from the left, on a reduced scale relative thereto;

Fig. 25 is a view, partially in side elevation and partially in section of stamp driving and control parts under the table top of Fig. 1;

Fig. 26 is a view taken along the line 26—26 of Fig. 25, partially in top plan and partially in section of the structure thereof;

Fig. 27 is a view taken substantially along the line 27—27 of Fig. 25, parts being in elevation and parts being in section;

Fig. 28 is a sectional view taken substantially along the line 28—28 of Fig. 25, showing a novel cam and drive pulley wheel structure of the invention;

Fig. 29 is a view taken generally along the line 29—29 of Fig. 25;

Fig. 30 is a detail view of certain latching and releasing parts as seen in Fig. 25, but enlarged relative thereto;

Fig. 31 is a view similar to Fig. 30, showing the latch parts in different operative relation to each other from the relation thereof of Fig. 30;

Fig. 32 is a view partially in section and partially in elevation taken substantially along the line 32—32 of Fig. 30;

Fig. 33 is a view partially in section and partially in elevation taken substantially along the line 33—33 of Fig. 30;

Fig. 34 is a view partially in top plan and partially in section taken along the line 34—34 of Fig. 1, showing a novel treadle operating device for the machine of the invention;

Fig. 35 is a sectional view taken substantially along the line 35—35 of Fig. 34;

Fig. 36 is a view, partially in elevation and partially in section, taken substantially along the line 36—36 of Fig. 1, of control, drive and latch elements of the invention, parts being broken away;

Fig. 37 is a plan view, parts being in section, taken along the line 37—37 of Fig. 36, of a portion of the structure of the invention for receiving articles to be stamped and adjusting the level of the stamp relative thereto;

Fig. 38 is an electrical circuit diagram of a heated stamp structure of the invention;

Fig. 39 is a view, partially in elevation and partially in section and similar to Fig. 1, of the invention in modified form, parts being broken away;

Fig. 40 is a detail view, parts being broken away, of structure shown under the table top of Fig. 39, enlarged relative thereto, showing a novel means for superimposing on the stamp a pressure in addition to an initial pressure thereof;

Fig. 41 is a view similar to Fig. 40 of parts thereof in different operative relation to each other, also showing more clearly a device for preventing the stamp from making a complete stamping movement under certain conditions;

Fig. 42 is a view partially in section and partially in elevation taken substantially along the line 42—42 of Fig. 40;

Fig. 43 is a view partially in elevation and partially in section taken substantially along the line 43—43 of Fig. 40;

Figure 45:
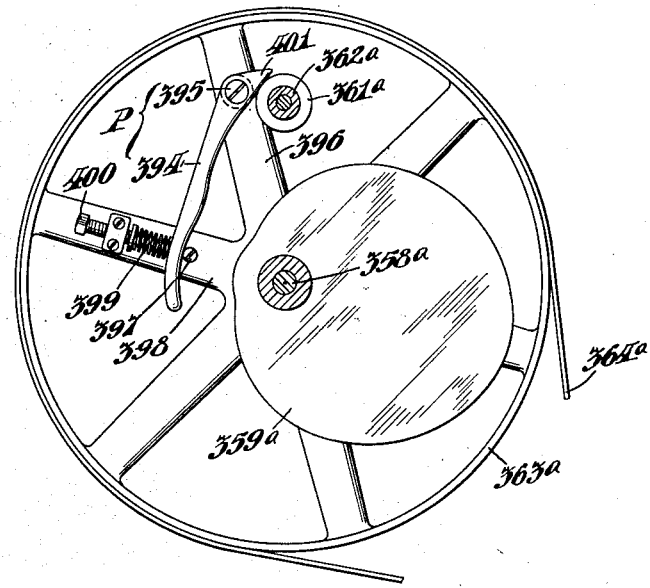
Figure 46:
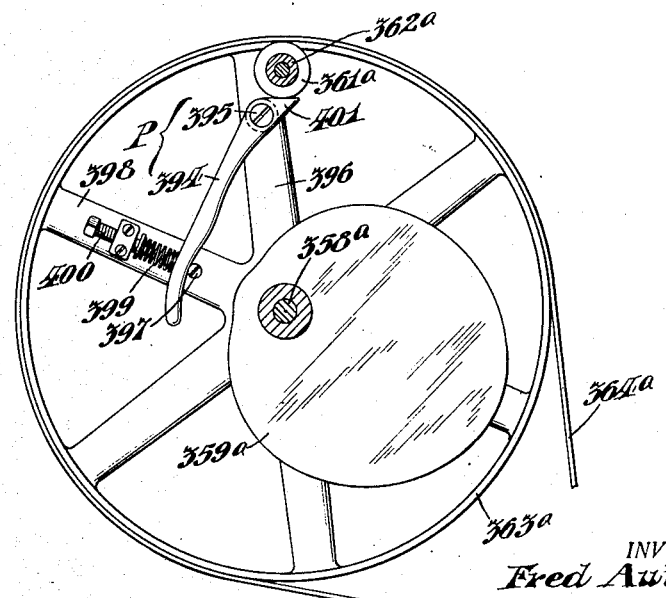

Fig. 44 is a plan view, parts being in section, taken along the line 44—44 of Fig. 39, of a portion of the inventive structure for receiving, in stamping position, articles to be stamped; and Figs. 45 and 46 are detail views of portions of the structure as seen in Figs. 40 and 41, with the parts in different positions.

In practicing the invention, in the form of mechanism illustrated in the first thirty-eight figures of the drawings, it is adapted as a machine for marking the toe portions of full fashioned stockings.

A main supporting base or table is provided over its top, in closely adjacent parallel plane relation thereto, with a thin panel like turntable of generally oblong plan such that, in either of its two operative positions relative to the main table and the stamp, one of the longer straight edges is parallel, and adjacent to, the front edge of the main table; the operator, by this feature, being able to quickly pivot the turntable, and by touch, place it in proper position by locating one of its long edges parallel to the front edge of the main table.

On the top surface of the turntable, like areas spaced from each other are each adapted to receive a plurality of full fashioned stockings in flat stacked form, extending in the same direction relative to a line about the pivot, and along the long sides, of the turntable so that the toe portions of the stockings of one stack are adjacent to the welt portions of the stockings of the other stack. The turntable may have any suitable number of sides, for lining with the front edge or other portion of the main table, with a corresponding increase in the number of areas for receiving stocking stacks, as above indicated.

Pivoted elements or arms on the turntable are each disposed adjacent to the position of the insteps of the stacked stockings on one of the stocking-receiving areas. Each arm is provided with an over-the-center spring detent adjacent to its base, whereby, it is either positively held in vertical position out of the way of receiving the stockings onto the turntable, or is biased toward its stocking stack across the instep portions when in substantially horizontal lowered position. When either long edge of the turntable is parallel to the front edge of the main table, one of the stocking stack receiving portions is adjacent to the operator at the front of the main table, for unloading stockings that have been stamped and loading onto the turntable stockings that are to be stamped, and the other stocking receiving portion is in stamping position. After the last stamping operation of the next previous stack, a rapid half turn of the turntable removes the stamped stockings from stamping position for removal from the machine, and places a new pile of stockings in their place.

A vertically reciprocable stamp supporting plunger tube is of inverted substantially J-shape having its long arm extending through the main table top between positions well above, and well below, this top, and its short arm constituting an overhanging upper support at the lower end of which the stamp unit is supported. This unit comprises a stamp shoe or element proper, a heater, a switch for the heater, a thermo responsive element subject to the heat of the stamp for controlling the operation of the switch, means for adjusting the thermo responsive element to operate the switch at a given stamp temperature, and a thermal responsive indicator or thermometer for aiding in effecting the switch adjustment. Conducting leads for the stamp, switch, etc., extend through the stamp supporting plunger tube to a control box or panel at the front underside of the main table.

The inverted J-tube is biased, by springs beneath the main table top, downwardly or toward its stamping position. A rotary cam beneath the main table top has one high, and one low, spot uniformly and symmetrically merged into each other and acting against a roller on the plunger, and against the downward spring bias of the latter, to uniformly raise and lower the stamp. An over the center spring biased latch, under the main table top, is operated by a treadle to catch and hold the stamp plunger in its upper position, to which it is moved by the high spot of the cam, and to release the stamp only when the high spot of the cam can directly receive the roller. This feature prevents releasing the stamp plunger to drop the roller any appreciable distance before engaging the cam whereby damage to the parts might result.

A support for a roll of ribbon like transfer paper is disposed behind the stamp above the table top, the ribbon extending rearwardly from the roll around a spring tension arm, through a swing arm clutch advancer for the ribbon, through a combined paper holding and adjusting device to a guide near the stamp, over a roller and guides above the stamp, and from the latter point back to the roll over which is disposed a tensioning device tending to pull the ribbon faster than it is fed, but having slip relation thereto whereby the ribbon is maintained taut.

The swing arm or oscillatory clutch is controlled by a reciprocable cam on the plunger above the table such that, upon its stroke away from the stamp, the clutch releases the ribbon and, upon its stroke toward the stamp, the clutch grips the ribbon and pulls it off the roll. When thus released, the ribbon is gripped by the combined holding and adjusting device to prevent backward movement of the ribbon by the swing arm clutch and, when the ribbon is gripped by the clutch, it is released by the holding and adjusting means which may also be operated to adjust the ribbon horizontally, before the clutch is operated, to ensure that imprints on the ribbon will stop, between advance strokes of the ribbon, exactly on the stamp receiving portion; the strokes of the swing arm being adjustable for rendering them equal to the distance between imprints on any of various ribbons. The combined holding and adjusting device, on the one hand, and the ribbon guide adjacent to the stamp, on the other hand, cooperate to hold the ribbon off the stamp in the upper or retracted non-stamping position of the latter and in other positions away from the stamping position.

In front of the stamp, a pick up arm is provided having both pivotal and lifting movement whereby, upon each stamping operation, the arm descends, picks up a foot portion of a stocking and folds it along an instep line over one of the above mentioned arms for holding the stocking stack in place, out of the way of the stamp to enable the next succeeding stocking to be marked.

In the form of the invention illustrated in Figs. 39 to 46, inclusive, the structure and operation are similar to those above generally set forth with a few exceptions, the first of which is the omission of the pick up arm last described. The turntable is also omitted, and provision made for stamping separate articles of different size and shape instead of stacks of articles as in the first described form.

Also, as against the more or less delicate yielding pressure of the stocking stamp, which stamps lower stocking portions of a stack successively, the device of Figs. 39 to 46, is provided with means for superimposing on the already biased stamp plunger an additional stamp pressure at the lower end of the plunger stroke, which is effected by a spring biased cam located on the pulley wheel below the table top, this cam dragging over the roller for the rotary cam to accomplish this purpose. Means is also provided whereby, if the treadle latch is operated to release the plunger from its upper held position just after the high spot of the main operating cam has passed its vertical central position for receiving the plunger roller, the stamp cannot reach its stamping position. A further feature resides in a device on the main drive pulley wheel and constituting a part of the above mentioned superposed pressure device, whereby if the plunger should stick in any intermediate position, it will be pushed up or down depending upon its position, thus offering it an opportunity for another start and preventing damage to the parts.

Referring to Figs. 1, 2, 5, 11, 18, 19, 21, 25, 26 and 36, the device, in one form, comprises, in general, a main base support or table 2 including legs 3, as of metal tubing, secured by brackets 4, to a stop 7, as of sheet metal coated with baked enamel. A turntable 8 is in the form of a thin, generally oblong panel, as of Bakelite, disposed above and in closely adjacent parallel plane relation to the table top 7, rotatably mounted by a stud 9, and provided at its underside fixed thereto with an element 12, as of felt, for sliding on the top 7 to prevent damage from friction thereto, and also to act as a cushion against the action of the stamp. Areas spaced from each other on the top surface of the turntable 8 are adapted to receive stacks A and B of full fashioned stockings in flat form, the stack A, as shown, being in position for stamping, and the stack B being in position for loading the stacks on, and unloading them from, the turntable. Longitudinal side edges C and D, joined by shorter arcuate end edges E, of the turntable 8 are adapted to be placed along the front edge F of the main table top 7, the latter edge operating as a feeler guide whereby the operator may quickly adjust the turntable to position. Elements or arms 13, see also Figs. 3 and 4, are each pivotally mounted at one end in a dome shaped base 14, on the turntable, enclosing an over-the-center, spring biased ball detent device 17 for biasing the arm toward its upper or stocking release position, indicated in dot-and-dash lines in Fig. 4, and also, when moved from this position to its horizontal stocking holding position, to bias it toward the stockings after it passes the center of its path of pivotal movement. Each arm 13 serves not only as a means for holding the stocking stacks in position, but also, as shown in connection with the stack A of Fig. 2, as a means or element over which the foot portion of each stocking is folded out of the line of action of the stamp after each stamping operation, as will further appear.

A stamp supporting plunger tube 18 is of inverted substantially J-shape having a long arm 19 extending from a point well above the table top 7, through this top, to a point well below the top, and has its upper end rounded or merged into a short arm 22 in a type of overhanging structure carrying at its lower end a self contained stamp unit G. The latter, as better seen in Figs. 12 and 13, comprises a shoe or stamp portion proper 23, a resistor heater 24, a thermo-responsive device or bimetallic element 27, a switch 28 and a thermometer 29.

The stamp portion 23 has a cylindrical upper extension 32 in which the resistor 24 is disposed and around which is disposed a cylindrical body 33 of heat resisting material, such as asbestos, whereby to better heat the portion 23 and insulate an upper casing or shell 34 in which the parts are mounted. The switch 28 comprises movable and stationary contact members 37 and 38, respectively, shown only diagrammatically in Fig. 38, carried by a member 39, Fig. 12, that is pivoted by a pin 42 to the shell 34. An adjusting screw 43 limits the clockwise movement of the member 39, as viewed in Fig. 12, in which direction the member is biased by a spring 44. A button 46, Figs. 12 and 38, is for engagement by the element 27 to open the switch 28 when the stamp reaches a certain temperature which can be adjusted by turning the screw 43. The bimetallic element 27 is in non-electrical relation to the switch 28, but subject to the heat of the stamp for controlling the switch. The thermometer 29 illustrated is of the spiral bimetallic element type and operates as an index as to the heating operation of the stamp, and for adjusting the switch 28.

A bracket 47 secured, as by a screw, to the short arm 22 of the plunger 18, Fig. 11, has a lower guide portion 49 for a transfer paper ribbon 50 and disposed in predetermined relation to the stamp shoe 23 and other parts to be hereinafter pointed out. At its upper portion, the bracket 47 carries guide arms 51 and a roller 52 for the ribbon 50 and has an arm 53 carrying a pivot spindle 54 to which a stocking pick-up device H is fixed. The arm 53 has a pair of bearing portions 55, Fig. 8, in which the spindle 54 is journaled. A radial arm 57, fixed to the spindle 54, Figs. 5, 8 and 11, carries a roller 58 for operation in a cam slot 59 of a member 62 secured to a main supporting bracket 63 mounted over the table top 7 on a sleeve 64 extending through the table top, Figs. 11 and 18. A bracket 67, also fixed to the spindle 54 has journaled therein a shaft 68 on which is fixed a single-tooth ratchet disk 69, see also Fig. 7, having a side projecting pin 72. A radial arm 73, see Fig. 6, is also fixed to the shaft 68 and has a lost motion pivotal connection 74 to the upper end of a wire like rod 77 longitudinally movably disposed in a small tubular arm 78 and biased upwardly in the arm by a spring 79. The bracket 67 has a split clamp like portion 70 between the parts of which the arm 78 is fixed, as by a screw 71.

At the lower end of the small tubular arm 78, fixed thereto, is a bracket 82 having a fabric pick up finger 83, see Fig. 10, for cooperation with another fabric pick up finger 84 in the form of a bell crank lever pivotally mounted on the bracket 82 and having a friction finger tip element 87, as of rubber, for assisting in effecting a small gather or fold 88 in a stocking portion 89 which is being picked up. The rod 77 is pivotally connected to one arm of the bell crank pick up finger 84.

A pawl 92, Fig. 7, is pivotally journaled on the spindle 54 for cooperation with the single notch ratchet disk 69, and supports a pivot pin 90 carrying a screw 91 for longitudinally adjustably securing a rod 93 to the pivot pin. The rod 93 extends through the pivot pin 90 to a member 94 which by engagement with the stocking portion 89 releases the pawl 92 from the ratchet disk 69 to cause the pick up finger 84 to move from the position in which it is depicted in dot-and-dash lines in Fig. 10 to the position indicated in full lines in which the fingers 83 and 84 grip the stocking portion 89 at the slight fold 88.

The pick up device H has both pivotal movement about the axis of the spindle 54 and up and down movement by action of the roller 58 in the slot 59 caused by vertical reciprocation of the stamp plunger 18 which carries the spindle 54 to thereby move it relative to the stationary member 62 having the cam slot 59 therein. An element 97, Figs. 7 and 8, fixed to one of the bearing portions 55 of the arm 53, cooperates with the side projecting pin 72 on the ratchet disk 69 to release the fold 88 of the stocking portion 89. At the end of upward movement of the device, the pawl 92 is latched by the single notch of the disk 69.

Figure 1:
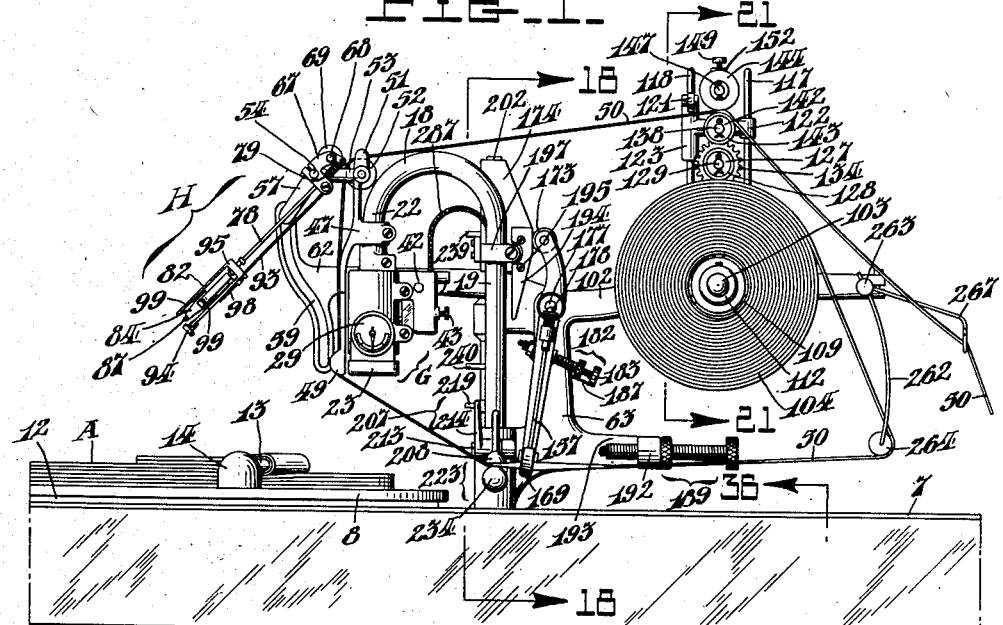
Figure 15:
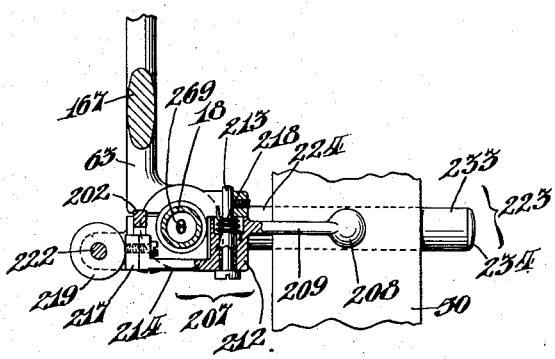
Fig. 15 is a sectional view taken substantially along the line 15—15 of Fig. 18 of a novel device for preventing backward movement of the ribbon and for adjusting it longitudinally.

When the machine is idle, and between stamping operations, the parts of the pick up device H are positioned as in Figs. 1, 2 and 11, in which the roller 58 is adjacent to the top of the cam slot 59, the pin 72 is against the element 97, the rod 77 is held in lower position against the action of the spring 79, the rod 93 is biased downwardly by a spring 98, the member 94 is in the position indicated by dot-and-dash lines of Fig. 10, and the pick up fingers are separated, as indicated by the dot-and-dash line position of the finger 84 in Fig. 10. The spring 98 surrounds a hollow screw or screw threaded sleeve 999 which in turn surrounds the rod 93 in the bracket 82 and is locked in position by a nut 100; the screw 999 limiting upward movement of the rod 93 by engagement with a collar 101 fixed to the rod.

When the stamp 23 moves from the upper position of Figs. 1, 2 and 11 to the lower, or stamping, position of Fig. 5, the roller 58 is so guided in the cam slot 59 that the arm 78 is pivoted clockwise about the axis of its point spindle 54, as viewed in Fig. 11, or counterclockwise, as viewed in Figs. 1 and 5, during which movement the fingers 83 and 84 are separated and the member 94 is in its lower position as indicated in Fig. 10. At the bottom of its stroke, the member 94 engages the fabric and is pushed upwardly thereby, this action moving the rod 93 upwardly against the action of the spring 98 to release the pawl 92 from the ratchet disk 69. Since the arm 73 is fixed to the shaft 68 with the ratchet disk 69, when the latter is released by the pawl 92, the rod 77 is forced upwardly relative to the tubular arm 78 and the bracket 82 to move the bell crank pick up finger 84 from its dot-and-dash line position to its full line position of Fig. 10, thereby causing the friction finger tip element 87 to move the fold 88 into position between the fingers 83 and 84 where it is held during the upward movement of the stamp. During the latter movement, the roller 58, in its reverse traversal of the cam slot 59, moves the arm 78 clockwise about the axis of the shaft 68, as viewed in Figs. 1 and 5, or counterclockwise, as viewed in Fig. 11; the fingers 83 and 84 with the fabric held thereby being moved upwardly and outwardly away from the stamp in an action folding the fabric or forward foot portion of the stocking over the adjacent arm 13 on the turntable 8. Near the upper end of the stroke of the arm 78, the pin 72 engages the element 97. Continued turning movement of the arm 78 about the axis of the spindle 54 causes the ratchet disk 69 to move relative to the pawl 92 until the latter falls into the disk notch thus separating the fingers to open position in which they are latched until the end of the next downward stroke. At the same time, the rod 93 and the member 94 are forced downwardly to the dot-and-dash line position of the latter of Fig. 10, ready for another pick up operation, and the stocking portion is dropped over the arm 13 to position indicated in Figs. 1 and 2. These actions are repeated with each stamping action, with the downward spring tension of the stamp, as hereinafter set forth, so effected by a spring under the table top 7 as to produce effective transfer of marks from the ribbon 50 to the stocking portions at the successive lower levels of the stocking stack A.

To vary the pick up ability of the fingers 83 and 84 according to the character of the articles to be picked up, the device H is provided with a member 95 vertically adjustably mounted on the arm 78 by a screw 96 and provided with depending arms 99 for engagement with the articles.

By adjusting the member 95 up or down, within comparatively small limits, the arms 99 will so engage the fabric as to impart to the fingers 83 and 84 a light, intermediate or heavy pick up touch, so to speak. Thus, in picking up successive thin stocking layers of the stack to avoid having the fingers 83 and 84 pick up more than one stocking portion at a time, the member 95 is adjusted downwardly so that the arms 99 will press the fabric away from the fingers just enough to enable the picking up of one stocking portion. Where a heavier article of a stack is to be picked up, the member 95 and its arms 99 may be adjusted upwardly from the light touch pick up position to a heavier touch pick up position.

By adjusting the rod 93 longitudinally in the pivot pin 90 and fixing it in adjusted position by the screw 91, and by adjusting the screw 999 relative to the collar 101 and fixing it in adjusted position by the nut 100, the vertical distance of movement of the rod 93 after the member 94 strikes the fabric to release the pawl 92 from the ratchet disk 69 can be adjusted to vary the time of pick up operation of the fingers 83 and 84 relative to the pressure of the arms 99 on the fabric.

Referring to Figs. 1, 2, 21, 22, 23 and 24, an arm 102 of the main supporting bracket 63 supports a fixed pin 103 on which is rotatably mounted a support j for a reel 104 of the ribbon 50, this support comprising an inner sleeve 107, a washer 108, an outer sleeve 109, a collar 112, a sleeve member 113 and a member 114 to which are vertically fixed a pair of rods 117 and 118. A vertically reicprocable carriage 119 on the rods 117 and 118 has a single slide bearing 122 on the rod 117 and a bearing 123 on the rod 118. The bearing 123 supports pivot pins 120 for rollers 121 engaging the rods to prevent binding of the carriage on the rods. A roller 127 having a friction tire 128 thereon, as of rubber, leather or other material, engages the reel 104 and is supported on a pin 129 extending from a depending portion 132 of the carriage 119. A sleeve 133 connects the roller 127 to a gear wheel 134 engaging a gear wheel 137 similarly mounted on a pin 138 projecting from the carriage 119 and connected by a sleeve 139 to a roller 142 having a friction tire 143 for engagement with the underside of a draw off portion of the ribbon 50 from which the imprints have been removed in the stamping operation. A roller 144, engaging the upper side of the draw-off portion of the ribbon 50 is journaled on a pin 147 that is pivotally mounted by a pin 148 on the carriage 119. A screw 149, in an upper arm 152 of the carriage 119, engages a spring 153 for adjusting a yielding pressure on the ribbon 50 between the rollers 142 and 144.

When the ribbon 50 is drawn from the reel 104, it actuates the roller 127 and thereby rotates the rollers 142 and 144 which tend to move the ribbon at a faster rate than it is moved by ribbon advancing means to be hereinafter set forth, thereby constantly maintaining the paper at proper tension for effective stamping and operation; the roller 142 being adapted to slide relative to the ribbon 50 when its peripheral speed is faster than the speed of the ribbon permitted by the advancing means.

Referring to Figs. 1, 2, 5, 18, 19 and 20, means for advancing the paper in measured steps or lengths comprises an oscillatory arm 157 longitudinally reciprocably mounted in bearing portions 158 and 159 of a rocker lever 160 journaled on a bearing 162 that is supported by a branch 167 of the main supporting bracket 63. A friction grip member 168 enclosed in a bearing sleeve 170 in a bushing 171 at the lower end of the arm 157, is adapted to engage the ribbon 50 at, and to advance it from, the rear end of the counterclockwise swing of the arm 157, as viewed in Fig. 5, to the forward end of the swing as viewed in Fig. 1, in doing which the grip member 168 presses the paper against a portion 169 of the rocker arm 160 shaped to render the ribbon of curved cross section at this point to hold it in a similarly curved slot 172.

Oscillation of the arm 157, and the rocker arm 160 on which it is mounted, is effected by engagement of a roller 173 on the rocker arm with a cam 174 mounted on the stamp plunger 18.

The grip member 168 is caused to grip the ribbon 50 at the rear end of swing of the arm 157 and to release the ribbon at the forward end of swing of the arm 157 by a longitudinally reciprocable shaft 177 which presses and releases a button 178 at the head of the arm 157 that is biased toward ribbon releasing position by a spring 179.

A micrometer screw adjustment device 182, having a lock handle 183 on an inner screw 184 held by a spring 187 on an outer screw 188, Figs. 1, 5, 11 and 14, is provided to accurately gauge the distance of swing of the arm 157 in accordance with the distance from center to center of the imprints on the ribbon 50 whereby successive of these imprints, which may be differnt distances apart on different ribbons, are accurately centered at the stamping position; the inner screw 184 engaging a suitable cam to effect this result. A lock screw device 189 in a boss 192 on an arm 193 of the bracket 63 acts as a limit stop to prevent vibration of the arm 157 and to avoid cumulative error with repeated oscillations. The arm 157, in its rear position, is practically locked between the lock screw devices 182 and 189, and movable only when the stamp plunger 18 raises the cam 174.

Figure 16:
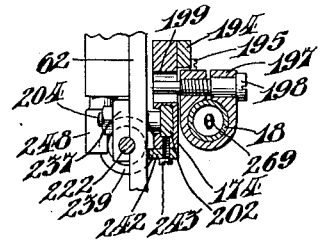
Fig. 16 is a sectional view taken substantially along the line 16—16 of Fig. 18.
Figure 17:
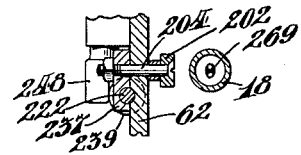
Fig. 17 is a sectional view taken substantially along the line 17—17 of Fig. 18.

The cam 174 has a lower portion 194 fixed thereto by screws 195, and is fixed vertically relative to the plunger 18 by a split clip 197, Figs. 5 and 16, and a screw 198, the inner end of which is disposed in a horizontal slot 199, which allows horizontal adjusting movement between the plunger and the cam, but not vertical relative movement. The cam 174 is of T-groove section embracing a stationary vertical guide bar 202 that is fixed adjacent to its bottom end, by screws 203 (Figs. 11 and 18) to the bracket 63, and at an upper portion thereof (Figs. 5 and 17) by a screw 204, to the bracket 63.

Figure 18:
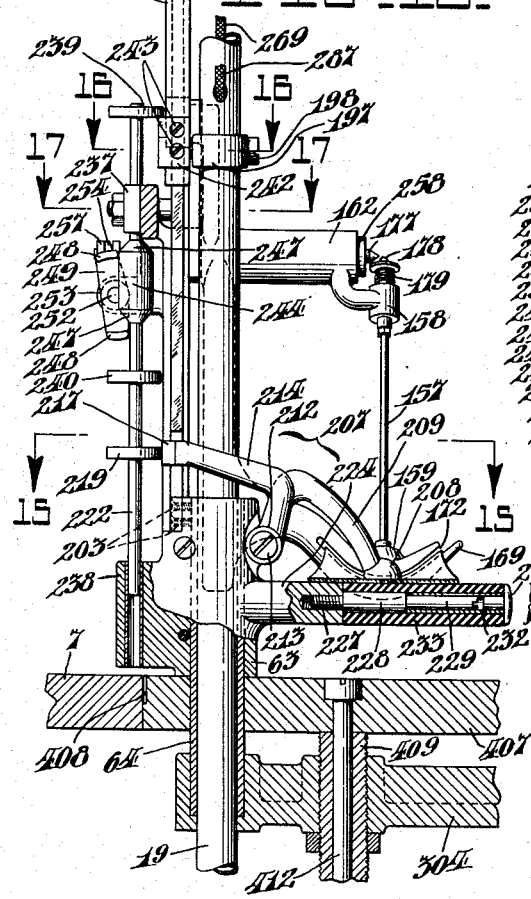
Fig. 18 is a view taken along the line 18—18 of Fig. 1, parts being broken away and other parts being shown in section or in elevation, of a paper feeding and gripping mechanism having its feeding elements released from the paper and its gripping elements gripping the paper.
Figure 19:
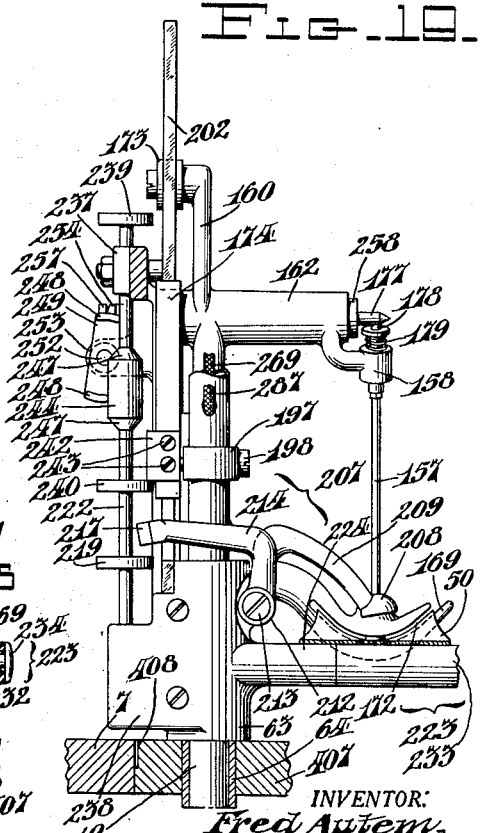
Fig. 19 is a view similar to Fig. 18 showing the feeding elements holding the paper and the gripping elements released from the paper.

Referring particularly to Figs. 1, 5, 15, 18 and 19, means for preventing backward slip of the ribbon 50, by contact with the friction grip member 168 and the portion 169 upon backward swing of the arm 157, or for other cause, comprises a lever 207 having a substantially hemispherical paper pressure head portion 208, an arm 209 on which the portion 208 is disposed, a pivot hub 212 that is pivotally mounted on a pin 213 in the bracket 63, an arm 214 having an element 217 secured thereto, and a spring 218 (Fig. 15) in the hub 212 around the pin 213 acting between the bracket 63 and the lever 207 for biasing the arm 207 counterclockwise, as viewed in Figs. 18 and 19, to release the pressure head portion 208 from the ribbon 50.

A disk 219 on a vertically reciprocable rod 222 engages the element 217 on the arm 214 to move the lever 207 clockwise from its position of Fig. 19 to its position of Fig. 18 for pressing the head 208 against the ribbon 50 at the end of each forward swing of the arm 157 which releases the ribbon when the head 208 engages the ribbon and swings backwardly from its position of Fig. 1 to its position of Fig. 5.

The head 208 presses the ribbon 50 against a normally stationary horizontal cylindrical element 223 which, as better seen in Fig. 18, comprises a portion 224 of the bracket 63, and a pin having a portion 227 screw threaded into the portion 224. The pin also includes an intermediate longitudinal section 228 of larger diameter than the portion 227 and an outer portion 229 of smaller diameter than the portion 228. A sleeve 232, of substantially the same diameter as the portion 228, surrounds the portion 229, and the portion 228 and the sleeve 232 are surrounded by a friction sleeve 233, as of rubber. A button 234 is provided to close the outer end of the cylindrical element 223.

Normally, the parts of the element 223 are frictionally held in stationary relation to each other so that the ribbon 50 slides over the element 223 against which it is periodically pressed by the head 208, as above set forth. However, if upon threading the ribbon through its guides, or at any other time, the imprints on the ribbon to be transferred to the articles to be stamped do not register with the stamp, the outer portion of the cylindrical element 223 can be forcibly rotated in either direction about its axis to adjust the ribbon. In thus rotating the movable parts of the element 223, the rubber sleeve 233 moves against the friction resistance of the stationary intermediate section 228 but rides with the sleeve 232 which has little or no friction on the stationary portion 229.

The rod 222 is journaled in bearings 231 and 238 on the bracket 63 and carries fixed disks 239 and 240 which are alternately engaged and moved by a dog 242 in the form of a plate fixed to the cam 174 as by screws 243.

A cylindrical element 244, on the rod 222, having frusto conical or cam ends 247 alternately engages contact portions 248 on a cam follower 249 pivoted on a pin 252 in a portion 253 of the bracket 63 to rock the follower 249 back and forth between the positions of Figs. 18 and 19, this motion being transmitted to the shaft 177 to engage the button 178 in timed relation to the swing of the arm 157 to cause the friction grip member 168 to alternately engage and release the ribbon 50, as above set forth. The rocking movement of the follower 249 is transmitted through its pin 252 to a yoke 254 (Fig. 20) operating between two collars 257 on the shaft 177. A sleeve 258 surrounds the latter to act as a longitudinal slide bearing for the shaft 177, and as a pivot bearing for the bearing portion 162 of the rocker lever 160 having a bearing liner 259 therein.

The structure, so far described, comprises parts, mostly above the table top 7, which further include a spring tension arm 262 fixed to a stud 263 on the arm 102 of the bracket 63 and carrying a roller 264, and a ribbon guide 267 also secured to the stud 263. With the parts as shown (Fig. 1), the ribbon 50 extends from the reel 104, about the roller 264, thereby flexing the arm 262, between the friction grip member 168 and the portion 169, over the cylindrical element 223 under the pressure head 208, past the stamp 23 at a position thereunder, to the guide portion 49 of the bracket 47, over the roller 52, between the rollers 142 and 144, and over the guide 267 to a receptacle 268 under the table top 7.

The pressure head 208 and the cylindrical element 223 are so disposed below and to the rear of the stamp 23, in the upper position of the latter, the guide portion 49 is so disposed in fixed relation to the stamp adjacent to the lower front side thereof, and the step-by-step advance movements of the ribbon 50 are so related to these points that the ribbon is in position for effective stamping, and rapid withdrawal from or movement relative to the stamp to prevent burning the paper; the ribbon being entirely off the stamp during a considerable portion of the stroke of the latter to prevent burning, and on the stamp for a sufficient length of time to have the imprints ready for effective transfer at the instant of stamping. An armored flexible cable 269 extends from the stamp unit G through the long arm 19 of the plunger 18 to a plug and socket device 272 in a switch box 273 of a control unit K secured to the underside of the table top 7, and further including a signal lamp 274, a switch 277, and a switch 278 for a motor 279 mounted beside the switch box 273.

Referring to Fig. 38, the electrical parts of the stamp above set forth are connected to a source of electromotive force through a service circuit 282, a master switch 283 and supply lines 284. Conductors 287 and 288 are disposed in the cable 269 above set forth; the conductor 287 being connected to the service circuit 282 through a fuse 289, and the conductor 288 being connected to the service circuit 282 through the signal lamp 274, the switch 277, an adjustable rheostat 292 and a fuse 293. A cable 294, Figs. 1 and 36, contains conductors 297 and 298, the former of which is connected to the supply line 282 through a fuse 299, and the latter of which is connected to the supply line 282 through the switch 278 and a fuse 302.

Referring to Figs. 1 and 25 to 36, inclusive, the long arm 19 of the plunger 18 is slidably disposed in a bearing portion 303 of a bracket 304 that is secured to the underside of the table top 7, as by screws 307, and supports depending rods 308 to which is fixed, at the lower ends thereof, a transverse member 309 having a central bearing portion 312 in which the long arm 19 of the plunger 18 is also slidably disposed. A bridge structure 313, adjacent to the upper ends of the rods 308, is fixed to the plunger arm 19, as by a clamp portion 314 and is provided with bearing portions 317 that are slidably mounted on the rods 308. A tension spring 318, connected between the vertically slidable bridge 313 on the plunger arm 19 and the stationary transverse member 309, tends to bias the stamp 23 toward its lower or stamping position. A detent 319, fixed to the plunger rod 19, cooperates with a latch arm 322 pivotally mounted on the stationary transverse member 309 by a pin 320 to hold the stamp 23 in its upper position against the bias of the spring 318. The latch arm 322 is connected by an over-the-center spring 323 to one arm 324 of a lever 327 that is pivoted by a pin 328 to a vertical bracket arm 329 constituting a part of the transverse member 309 fixed to the latter by a portion 332, Fig. 36. The latch arm 322 has an opening 330 in which a pin 331 on the transverse member 309 is disposed to limit the swing of the latch arm. The lever 327 has an arm 333 connected by a tension spring 334 to an arm 337 on the transverse member 309, and an arm 338 connected by a swivel joint 339 to a vertical rod 342 which is connected to one arm 343 of a pedal 344 by a connecter 347 allowing pivotal or swivel movement in the connection. A pin 350 in the vertical bracket arm 329 limits movement of the arm 324 in the counterclockwise direction, as viewed in Figs. 25, 30 and 31. The pedal is pivotally mounted by a pin 348 to a floor bracket 349, and has another arm 352 in a recess of which a spring 353 biases a ball 354 laterally to the plane of pivot movement of the pedal toward a notch or recess 357 such that, when the pedal is moved to position in which the lever 327 tensions the spring 334, the ball 354 is pressed by the spring 353 into the recess 357 and the pedal 334 and the rod 342 are held in position against the action of the spring 334.

The vertical bracket arm 329 has an upper end bearing portion for a shaft 358 having a cam 359 thereon for cooperation with a roller 361 mounted on a hub 362 on the bridge 313 whereby, when the latch arm 322 is in open position, the roller 361 carrying all of the parts associated with the plunger 18, is reciprocated vertically of the cam 359. The latter has a high spot in its vertically central upper position and a low spot in its vertically central lower position, as viewed in Fig. 25, at which the latch arm 322 may cooperate with the detent 319 to hold the plunger in upper position. The cam is symmetrically outlined between its high and low spots at opposite sides of a line through these spots to provide uniform upward and downward movement of the stamp.

A large pulley wheel 363, mounted on the shaft 358, is connected by a belt 364 to a small pulley wheel 367 on a shaft 368 that is connected by gear wheels, in a gear box 369, to the shaft 372 of the motor 279, the latter being mounted by screws 373 on an arm 374 of a sleeve 377 on a shaft 378. The shaft 378 is journaled near one end in the vertical bracket arm 329 and, near its other end, in a bracket 379 secured by angle members 381 and 382 constituting parts of the framework of the table top 7. Another arm 383 on the sleeve 377 cooperates with a screw 384 in a branch 387 of the vertical arm 329 to limit the upward position, counterclockwise about the axis of the shaft 378, as viewed in Fig. 1, to which the motor 279 may be moved. The motor being thus suspended with its weight on the belt 364, the latter is maintained taut irrespective of elongation or shrinkage thereof.

Under the turntable 8, at the stamping position, an insert plate 407 is provided in the table top 7, this plate having a bottom portion closely fitting an aperture in the table top, and a top portion of slightly reduced dimensions parallel to its top surface to provide a slight slot or groove 408 between it and the adjacent surfaces of the table top. Exteriorly screw threaded sleeves 409, of which there are three in this instance, are mounted in the bracket 304 to provide a substantially universal adjustment of the plate 407 relative to the plane of the table top 7.

By adjusting the sleeves 409 vertically in the bracket, the top plane of the plate can be adjusted relative to the top plane of the surrounding surface of the table top, such that, when the stamp presses the turntable 8, the latter will be in accurate flat plane parallelism to the flat plane under surface of the stamp shoe 23, thus ensuring uniform pressure throughout the area of the imprint to be transferred and producing an effective mark.

When the plate 407 is thus adjusted, bolts 412 extending through the plate and the sleeves 409 are secured in position by nuts 413 to fix the plate in adjusted position. By reason of the presence of the groove 408, injury, such as chipping of the adjacent edges of the table top 7 and the plate 407 by engagement with each other during the above-described adjustment, is avoided.

While the machine is idle, the electrical elements and circuits are conditioned as shown in Fig. 38. To start the machine, the master switch 283 is closed to connect the service circuit 282 to the supply lines 284. After this, the switch 277 is closed to energize the circuit of the resistor heater 24 for heating the stamp shoe 23, and, since the signal lamp 274 is in this circuit, the lamp will be energized to indicate to the operator that the shoe is being heated. After these conditions have been established, the switch 278 is closed to energize the motor 279.

With the motor operating, and the parts positioned as indicated in Figs. 1, 25, 30 and others, pressure on the arm 343 of the pedal 344 to move the pedal clockwise, as viewed in Fig. 1, causes the rod 342 to move downwardly, thus carrying the arm 324 of the lever 327 clockwise as viewed in Fig. 30 to the position of Fig. 31, in which the spring 323 has crossed the center of its path of movement and, instead of biasing the latch arm 322 toward latching position, as in Fig. 30, biases the latch arm away from latching position, but does not release it to release the detent 319 until the high spot of the cam 359 assumes the weight of the plunger 18 and parts thereon, and relieves the latch arm of this weight. Upon release of the detent 319 by the latch arm 322, the roller 361 is free to ride on the cam 359 which it does by the force exerted by gravity and by the spring 318. So long as the latch arm 322 is maintained out of contact with the detent 319, the stamp plunger 18 continues to reciprocate and the parts above the table top 7 continue to operate as above set forth, the stroke of the plunger increasing slightly after each stamping operation in the pick up and fold over operation of the device H.

Pressure on the arm 352 of the pedal 344 to move the rod 342 upwardly from its position of Fig. 31 to its position of Fig. 30, throws the spring 323 across the center of its path of movement to the right whereby the latch arm 322 is in position to catch and hold the detent 319 at the end of its next upward stroke, thus catching and holding the stamp 23 in its upper inactive position of Fig. 1, with the pick up device H in the position it assumes after having picked up a stocking foot portion and folded it over the adjacent arm 13.

During the above described operation, until the stamp gets too hot, the bimetallic element 27 remains out of contact with the button 46, but when the temperature increases to a certain value, the element 27 flexes such as to engage the button 46 and open the switch 28. This action, which is indicated to the operator by the signal lamp 274, starts cooling the stamp and the bimetallic element 27. Upon cooling, the element 27 retracts toward the position of Fig. 38, upon reaching which, it again releases the buton 46 to close the switch 38. This action is automatically repeated to maintain the stamp substantially constantly at a precise temperature within close limits. The thermometer 29 provides means for observing the correct working of the stamp circuit and of any changes necessary or desirable in the heating which may be effected by adjusting the rheostat 292. Operation of the machine is stopped by preferably first opening the switch 278 and then the master switch 283, with the opening of the switch 277 effected before or after the opening of the switch 278.

In the form of my invention illustrated in Figs. 39 to 46, inclusive, corresponding parts are designated by corresponding reference characters having the suffix "a", attention being directed to the fact that parts shown and designated by reference characters having the suffix "a" and not mentioned herein are like the corresponding parts set forth above in connection with the first described form of the invention.

The construction and operation are similar to that above described with few exceptions, one of which resides in the omission of the turntable 8 and appurtenant parts, the omission of the arm 63 and its associated elements, and in the provision over the table top 7a of a support 392 having a stamp pad portion 393 thereon. In this form of the invention, the machine is capable of stamping articles of various sizes, kinds, shapes and textures, such as felt hats, bathing suits, underwear and the like.

Another exception to the construction of the device of Figs. 1 to 38, inclusive, resides in means P, for augmenting the stamp pressure provided by the spring 318a, in the form of a lever 394 pivoted by a pin 395 to one spoke 396 of the pulley wheel 363a and biased against another pin 397 on the next succeeding spoke 398 by a spring 399 extending between the lever 394 and an adjustable screw device 400 on the spoke 398.

The lever 394 in passing the roller 361a, in its clockwise rotation of the pulley wheel 363a, as indicated in Figs. 40 and 41, has a cam wiping action on the roller 361a whereby to superimpose the pressure of the spring 399 upon the downward pressure of the stamp plunger 18a by gravity and the spring 318a at the lower end of the stroke of the plunger. Thus, after the stamp 23a has been pressed by gravity and the spring 318a against an article on the stamp pad 393, the arm 394 wipes across the top of the roller 361a to give a final further push to the stamp to ensure effective transfer of an imprint from the ribbon 50a to the article being stamped.

Should the stamp plunger 18a be caused for any reason to stick at an intermediate position of its downward stroke, the lever 394, which is provided with a tapered end 401, will engage the roller 361a either over the center thereof, as indicated in Fig. 45, to push the plunger downwardly, or will engage the roller 361a under the center thereof, as indicated in Fig. 46, to push the plunger upwardly, depending upon the position of stoppage of the plunger below or above the end 401 of the lever 394.

To avoid inking the stamp pad 393, a lever 402, pivoted on the extension 337a, is provided with a free end head 403 for insertion between the hub 362a of the roller 361a and the top of the vertical stationary bracket arm 329a.

In the unlatched, or reciprocating position of the parts, indicated in Fig. 41, the lever 402 and its head 403 are held in the position shown by engagement of the lever 324a with a pin 404 on the lever 402. When the pedal 344a is operated to move the rod 342a to its upper position of Fig. 40, the lever 402 moves clockwise from its position of Fig. 41 to its position of Fig. 40. If this occurs after the high spot of the cam 359a crosses its bottom central position on its way up, the detent 319a will be caught by the latch arm 322a to hold the plunger in its upper position, as above set forth, and the lever 402 will not function, but, if the lever 402 is caused to assume its position of Fig. 40, by operating the pedal 344a to move the latch arm 322a to latching position after the high spot of the cam 359a crosses its top central position, the latch arm 322a cannot function until the cam 359a makes almost a complete revolution so that, in its downward stroke under these conditions, the stamp 23 will be prevented from striking the pad 393 by engagement of the hub 362a of the roller 361a with the head 403 of the lever 402, and the latching of the plunger in its upper portion will occur upon the completion of this rotation of the cam.

The support 392 for the stamp pad 393 is mounted on an insert plate 407a in the table top 7a, similar to the plate 407 above set forth, this plate also having a bottom portion closely fitting an aperture in the table top, and a top portion of slightly reduced dimension parallel to its top surface to provide a slight slot or groove 408a. Exteriorly screw threaded sleeves 409a provide for a substantially universal adjustment of the plate 407a relative to the plane of the table top 7a and are mounted in a bracket 304a.

By adjusting the sleeves 409a vertically in the bracket, the top plane of the plate can be adjusted relative to the top plane of the surrounding surface of the tabletop 7a such that the stamp pad 393 can be adjusted into accurate flat plane parallelism to the flat plane undersurface of the stamp shoe 23a.

When the plate 407a is thus adjusted, bolts 412a extending through the plate and the sleeves 409a, are secured in position by nuts 413a to fix the plate in adjusted position.

Of course, the improvements specifically shown and described by which I obtain the above results, can be changed and modified in various ways without departing from the invention herein disclosed and hereinafter claimed.

I claim as my invention:

1. In combination in a device for receiving articles of wearing apparel, a member for receiving in stamping position articles to be stamped, a support for a roll of ribbon-like material bearing marking elements for successive transfer from the material to said articles, means for guiding the ribbon from the roll past said stamping position, means for advancing the ribbon at a given speed from the roll toward and beyond said stamping position, a stamp member, means for effecting engagement between said members to press said ribbon against said articles for effecting said transfer, and means for tensioning the ribbon including means tending to move the ribbon at a faster rate than said advancing means against the action thereof.

2. In combination in a device for stamping articles of wearing apparel, a portion for receiving in stamping position stacks of articles to be stamped, a support for any one of a plurality of rolls of ribbon like material bearing marking elements spaced equally by different distances on the respective ribbons for successive transfer from the material to said articles, a stamp arranged to move varying distances into stamping position according to the height of said stack of articles, means for advancing the selected ribbon from the roll toward and beyond the stamp in steps according to the spacing of the marking elements on the selected ribbon including an oscillatory arm, and means movable with the stamp for oscillating said arm in steps corresponding to the spacing of said marking elements on the selected ribbon during movement of the stamp member through said varying distances.

3. In combination in a device for stamping articles of wearing apparel, a portion for receiving in stamping position articles to be stamped, a support for a roll of ribbon like material bearing marking elements for successive transfer from the material to said articles, means for guiding the ribbon from the roll past said stamping position, means for advancing the ribbon at a given speed from the roll toward and beyond said stamping position, a stamp, means for actuating the stamp to press said ribbon against said articles for effecting said transfer, and means for tensioning the ribbon including means tending to move the ribbon at a faster rate than said advancing means against the action thereof.

4. In combination in a device for stamping articles of wearing apparel, a portion for receiving in stamping position articles to be stamped, a support for a roll of ribbon like material bearing marking elements for successive transfer from the material to said articles, means for guiding the ribbon from the roll past said stamping position, means for advancing the ribbon at a given speed from the roll toward and beyond said stamping position, a stamp, means for actuating the stamp to press said ribbon against said articles for effecting said transfer, and means for tensioning the ribbon including means operated by the roll in floating position thereon tending to move the ribbon at a faster rate than said advancing means against the action thereof and relative to the ribbon.

5. In combination in a device for stamping articles of wearing apparel, a portion for receiving in stamping position a stack of articles to be stamped, a support for any one of a plurality of rolls of ribbon like material bearing markings spaced equally by different distances on the respective ribbons for successive transfer from the material to said articles, a stamp arranged to move varying distances into stamping position according to the height of said stack of articles, means including means carried by the stamp for guiding the ribbon from the roll past the stamp and placing a marking element in proper relation to said receiving portion and adjustable means for advancing the selected ribbon from the roll toward and beyond the stamp in steps according to the spacing of the marking elements on the selected ribbon including an oscillatory arm, means movable with the stamp for oscillating said arm in steps corresponding to the spacing of said marking elements on the selected ribbon during movement of said stamp member through said varying distances, a clutch on the arm at the free end thereof movable therewith back and forth along the path of movement of the ribbon, and including a member movable relative to the arm, and means including means for moving said member relative to the arm for causing the clutch to grip and advance the ribbon toward the stamp in one direction of swing of said arm and to release the ribbon and swing relative thereto in the opposite direction of swing of the arm.

6. In combination in a device for stamping articles of wearing apparel, a portion for receiving in stamping position a stack of articles to be stamped, a support for any one of a plurality of rolls of ribbon like material bearing marking elements spaced equally by different distances on the respective ribbons for successive transfer from the material to said articles, a stamp arranged to move varying distances into stamping position according to the height of said stack of articles, means including means carried by the stamp for guiding the ribbon from the roll past the stamp and placing a marking element in proper relation to said receiving portion, and adjustable means for advancing the selected ribbon from the roll toward and beyond the stamp in steps according to the spacing of the marking elements on the selected ribbon including an oscillatory arm, means movable with the stamp for oscillating said arm in steps corresponding to the spacing of said marking elements on selected ribbon during movement of said stamp member through said varying distances, a clutch on the arm at the free end thereof movable therewith back and forth along the path of movement of the ribbon and including a member movable relative to the arm, means including means for moving said member relative to the arm for causing the clutch to grip and advance the ribbon toward the stamp in one direction of swing of said arm and to release the ribbon and swing relative thereto in the opposite direction of swing of the arm and means for holding the ribbon against backward movement during said oppositely directed arm swing and releasing the ribbon during advance of the latter by the clutch.

7. In combination in a device for stamping articles of wearing apparel, a portion for receiving in stamping position a stack of articles to be stamped, a support for any one of a plurality of rolls of ribbon like material bearing marking elements spaced equally by different distances on the respective ribbons for successive transfer from the material to said articles, a stamp arranged to move varying distances into stamping position according to the height of said stack of articles, means including means carried by the stamp for guiding the ribbon from the roll past the stamp and placing a marking element in proper relation to said receiving portion, and adjustable means for advancing the selected ribbon from the roll toward and beyond the stamp in steps according to the spacing of the marking elements on the selected ribbon including an oscillatory arm, means movable with the stamp for oscillating said arm in steps corresponding to the spacing of said marking elements on selected ribbon during movement of said stamp member through said varying distances, a clutch on the arm at the free end thereof movable therewith back and forth along the path of movement of the ribbon and including a member movable relative to the arm, means including means for moving said member relative to the arm for causing the clutch to grip and advance the ribbon toward the stamp in one direction of swing of said arm and to release the ribbon and swing relative thereto in the opposite direction of swing of the arm, and means for holding the ribbon against backward movement during said oppositely directed arm swing and releasing the ribbon during advance of the latter by the clutch, said means including means providing for lengthwise adjustment of the ribbon relative to the position of swing of the arm at which it is gripped by the clutch.

8. In combination in a device for stamping articles of wearing apparel, a member for receiving in stamping position articles to be stamped, a stamp member, means for moving one of said members into stamping engagement with the other of said members, latch means for holding one of said members out of stamping engagement with the other of said members, means for releasing said holding means for effecting said stamping engagement, and rotative means including a spring biased element for increasing the pressure between said members when in stamping engagement.

9. In combination in a device for stamping articles of wearing apparel, a member for receiving articles to be stamped, a stamp member, means for resiliently biasing one of said members into stamping engagement with the other one of said members, latch means for holding one of said members out of stamping engagement with the other of said members, means for releasing said holding means for effecting said stamping engagement and means including a spring biased element for increasing the pressure between said members when in stamping engagement in addition to said biasing means.

10. In combination in a device for stamping articles of wearing apparel, a portion for receiving in stamping position articles to be stamped, a reciprocable stamp normally biased toward said position, means for holding the stamp against said bias, means for releasing said holding means to effect stamping movement of the stamp, and means operative after the stamp is in stamping position for applying pressure in addition to said bias on the stamp against the article.

11. In combination in a device for stamping articles of wearing apparel, a portion for receiving in stamping position articles to be stamped, a reciprocable stamp normally biased toward said position, means for holding the stamp against said bias, means for releasing said holding means to effect stamping movement of the stamp, and rotative means including a spring biased element for applying pressure in addition to said bias on the stamp against the articles.

12. In combination in a device for stamping articles of wearing apparel, a portion for receiving in stamping position articles to be stamped, a reciprocable stamp normally biased toward said position, means for holding the stamp against said bias, means for releasing said holding means to effect stamping movement of the stamp, rotative means including a spring biased element for applying pressure in addition to said bias on the stamp against the articles, and safety means whereby if the reciprocable stamp fails to act in response to its said bias said rotative means will move the stamp one way or the other along its path of movement depending upon its position at the time.

13. In combination in a device for stamping articles of wearing apparel, a portion for receiving in stamping position articles to be stamped, a reciprocable stamp structure biased toward stamping position, a spring biased latch device for exerting its bias in either direction from an intermediate point of its movement whereby when moved in one direction from said point it holds said stamp structure away from stamping position and when moved in the opposite direction from said point it releases the stamp for movement to its stamping position, and means for operating said latch device.

14. In combination in a device for stamping articles of wearing apparel, a portion for receiving in stamping position articles to be stamped, a reciprocable stamp structure biased toward stamping position, a spring biased latch device for exerting its bias in either direction from an intermediate point of its movement whereby when moved in one direction from said point it holds said stamp structure away from stamping position and when moved in the opposite direction from said point it releases the stamp for movement to its stamping position, means tending to throw said latch device to latching position, and means opposing said latter means for operating said latch device.

15. In combination in a device for stamping articles of wearing apparel, a portion for receiving in stamping position articles to be stamped, a support for a roll of ribbon like material bearing marking elements for successive transfer from the material to said articles, means for guiding the ribbon from the roll past said stamping position, means for advancing the ribbon from the roll toward and beyond said stamping position, a reciprocable stamp biased to move in one direction from a given position toward said stamping position, means for actuating said stamp including a cam having a high spot for moving the stamp in the opposite direction from said stamping position to said given position, means for latching the stamp in said given position in inactive relation to the cam, and means for actuating said latching means to release the stamp for actuation by the cam and preventing the release at all times during normal operation of the device except when the cam is in position to become actively related to the stamp at said high spot.

16. In combination in a device for stamping articles of wearing apparel, a portion for receiving in stamping position articles to be stamped, a support for a roll of ribbon like material bearing marking elements for successive transfer from the ribbon to said articles, means for guiding the ribbon from the roll past said stamping position, means for advancing the ribbon from the roll toward and beyond said stamping position, a reciprocable stamp biased to move in one direction from a given position toward said stamping position, means for actuating said stamp including a cam having a high spot for moving the stamp in the opposite direction from said stamping position to said given position, means for latching the stamp in said given position in inactive relation to the cam, means for actuating said latching means to release the stamp for actuation by the cam, and means providing for the prevention of stamping said article receiving portion when the latter is unoccupied by an article to be stamped.

17. In combination in a device for stamping machine, a portion for receiving in stamping position articles to be stamped, a support for a roll of ribbon like material bearing marking elements for successive transfer from the ribbon to said articles, means for guiding the ribbon from the roll past said stamping position, means for advancing the ribbon from the roll toward and beyond said stamping position, a reciprocable stamp biased to move in one direction from a given position toward said stamping position, means for actuating said stamp including a cam having a high spot for moving the stamp in the opposite direction from said stamping position to said given position, means for latching the stamp in said given position in inactive relation to the cam, means for actuating said latching means to latch and release the stamp for rendering it inactive and active, respectively, relative to the cam, and means operative upon actuation of said latch actuating means after the cam high spot has passed its position of cooperation with the latching means for preventing the stamping of said article receiving portion.

18. In combination in a device for stamping articles of wearing apparel, a reciprocable stamp biased from inactive position toward stamping position, a circuit including a heater for the stamp, means for controlling the temperature of the stamp including a switch in said heater circuit and thermo responsive means subject to the heat of the stamp for controlling the switch, means for indicating the temperature of the stamp, a support for a roll of stamp transfer ribbon, means for feeding said ribbon past the stamp, means for adjusting the ribbon longitudinally, mechanism tending to take up the ribbon faster than it is fed, a cam for reciprocating the stamp having a high spot, mechanism effective opposite said high spot for latching the stamp in inactive position and releasing it for action relative to the cam, means for superposing stamping pressure on the stamp in addition to its said bias, means whereby the stamp in said inactive position is spaced from the ribbon, and means operative upon actuation of said latch actuating means after the cam high spot has passed its position of cooperation with the latching means for preventing actuation of the stamp to stamping position.

19. In combination in a device for stamping articles of wearing apparel, a portion for receiving in stamping position stacks of flexible material articles to be stamped, a stamp, means for picking up portions of successive of said articles and folding the picked up portions out of the line of action of the stamp, means for adjusting the touch of the pick up means to have lighter or heavier pick up ability depending upon a quality of said articles, and means for actuating the stamp and said pick up means.

20. In combination in a device for stamping articles of wearing apparel, a portion for receiving in stamping position stacks of flexible material articles to be stamped, a stamp, means for picking up portions of successive of said articles and folding the picked up portions out of the line of action of the stamp, including a pivoted arm structure having combined lifting and pivotal movement, and means for actuating the stamp and said pick up means.

21. In combination in a device for stamping articles of wearing apparel, a portion for receiving in stamping position stacks of flexible material articles to be stamped, a stamp, means for picking up portions of successive of said articles and folding the picked up portions out of the line of action of the stamp, including an arm structure having pick up fingers movable relative to each other to grip said material therebetween, and means for actuating the stamp and said pick up means.

22. In combination in a device for stamping articles of wearing apparel, a portion for receiving in stamping position stacks of flexible material articles to be stamped, a stamp, means for picking up portions of successive of said articles and folding the picked up portions out of the line of action of the stamp, including a pivoted arm structure having combined lifting and pivotal movement and pick up fingers movable relative to each other to grip said material therebetween, and means for actuating the stamp and said pick up means.

23. In combination in a device for stamping articles of wearing apparel, a portion for receiving in stamping position stacks of flexible material articles to be stamped, a stamp, means for picking up portions of successive of said articles and folding the picked up portions out of the line of action of the stamp, and means for actuating the stamp and said pick up means whereby to stamp a portion of one of the articles, pick up the stamped portion, fold it over, stamp a portion of the next succeeding article, pick up the latter portion, fold it over, and so on in like cycle depending upon the number of articles in the stack.

24. In combination in a device for stamping articles of wearing apparel, a portion for receiving in stamping position stacks of flexible material articles to be stamped, a stamp, an element over which portions of said articles are to be folded, means for successively picking up said portions and folding the picked up portions over said element out of the line of action of the stamp, and means for alternately actuating the stamp and said pick up means whereby to stamp a portion of one of the articles, pick up the stamped portion, fold it over said element, stamp a portion of the next succeeding article, pick up the latter portion, fold it over said element, and so on in like cycles depending upon the number of said articles in the stack.

25. In combination in a device for stamping articles of wearing apparel, a table, a portion on the table for receiving in stamping position stacks of flexible material articles to be stamped, a stamp, an arm mounted for pivotal movement relative to the table between a position in which portions of said articles are to be folded and a position out of the way of said folding position for receiving the articles therein, means for successively picking up said portions and folding the picked up portions over said arm out of the line of action of the stamp, and means for alternately actuating the stamp and said pick up means whereby to stamp a portion of one of the articles, pick up the stamped portion, fold it over said arm, stamp a portion of the next succeeding article, pick up the latter portion, fold it over said arm, and so on in like cycles depending upon the number of said articles in the stack.

26. In combination in a device for stamping articles of wearing apparel, a table, a portion on the table for receiving in stamping position stacks of flexible material articles to be stamped, a stamp, an element for pressing the articles against the table and over which element portions of said articles are to be folded, means for successively picking up said portions and folding the picked up portions over said element out of the line of action of the stamp, and means for alternately actuating the stamp and said pick up means whereby to stamp a portion of one of the articles, pick up the stamped portion, fold it over said element, stamp a portion of the next succeeding article, pick up the latter portion, fold it over said element, and so on in like cycles depending upon the number of said articles in the stack.

27. In combination in a device for stamping articles of wearing apparel, a table, a portion on the table for receiving in stamping position stacks of flexible material articles to be stamped, a stamp, an arm mounted for pivotal movement relative to the table between a position in which portions of said articles are to be folded over the arm and a position out of the way of said folding position for receiving the articles therein, an over-the-center spring detent device for alternately biasing the arm from the center of its path of movement toward said positions, respectively, means for successively picking up said portions and folding the picked up portions over said arm out of the line of action of the stamp, and means for alternately actuating the stamp and said pick up means whereby to stamp a portion of one of the articles, pick up the stamped portion, fold it over said arm, stamp a portion of the next succeeding article, pick up the latter portion, fold it over said arm, and so on in like cycles depending upon the number of said articles in the stack.

28. In combination in a device for stamping articles of wearing apparel, a base table, a stamp vertically reciprocably mounted on the base table for stamping said articles at a given position, means for moving the articles between said stamping position and a position at which the articles are loaded and unloaded relative to the article moving means including a horizontal table turnably mounted on the base table about a vertical axis and having a plurality of means for positioning stacks of said articles with the stacks spaced relative to each other such that when either one of opposite edges of the turntable is placed in predetermined position relative to the front edge of the base table one of said article positioning means is at said stamping position and another of the article positioning means is at said loading and unloading position, elements on said horizontal turntable over which portions of said articles are to be folded, means for successively picking up said portions and folding the same over said elements out of the line of action of the stamp, and means for alternately actuating the stamp and said pick up means to stamp a portion of one of the articles, pick up the stamped portion, fold it over one of said elements, stamp a portion of the next succeeding article, pick up the latter portion, fold it over said one element, and so on in like cycles depending upon the number of said articles in the stack for folding over said one element.

FRED AUTEM.

CERTIFICATE OF CORRECTION.

Patent No. 2,177,615.   October 24, 1939.

FRED AUTEM.

It is hereby certified that error appears in the printed specification of the above numbered patent requiring correction as follows: Page 1, first column, line 44, for the word "passing" read pressing; and second column, line 21, the words "Another object" should mark the beginning of a new paragraph; line 58, "Figure 1" should mark the beginning of a new paragraph; page 4, first column, line 38, for "stop 7" read top 7; page 11, second column, line 10, for "machine" read articles of wearing apparel; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.